(12) United States Patent
Chen

(10) Patent No.: US 10,757,787 B2
(45) Date of Patent: Aug. 25, 2020

(54) LED SECURITY LIGHT WITH INTEGRATED MOTION SENSOR AND MOTION SENSING LIGHTING SYSTEM

(71) Applicant: Vaxcel International Co., Ltd., Carol Stream, IL (US)

(72) Inventor: Chia-Teh Chen, Taipei (TW)

(73) Assignee: VAXCEL INTERNATIONAL CO., LTD., Carol Stream, IL (US)

( * ) Notice: Subject to any disclaimer, the term of this patent is extended or adjusted under 35 U.S.C. 154(b) by 0 days.

(21) Appl. No.: 16/104,506

(22) Filed: Aug. 17, 2018

(65) Prior Publication Data

US 2019/0059142 A1   Feb. 21, 2019

Related U.S. Application Data

(60) Provisional application No. 62/605,525, filed on Aug. 17, 2017.

(51) Int. Cl.
*H05B 47/10* (2020.01)
*H05B 45/00* (2020.01)
(Continued)

(52) U.S. Cl.
CPC ........... *H05B 47/105* (2020.01); *F21K 9/232* (2016.08); *F21V 5/04* (2013.01); *F21V 5/045* (2013.01);
(Continued)

(58) Field of Classification Search
CPC ............ H05B 37/0227; H05B 37/0281; H05B 33/0854; F21V 15/01; F21V 5/045;
(Continued)

(56) References Cited

U.S. PATENT DOCUMENTS 6,320,506 B1 * 11/2001 Ferraro .............. G08B 13/1409
315/129
6,820,998 B2   11/2004 Chen
(Continued)

OTHER PUBLICATIONS

Night lights, Outdoor lighting, https://www.lowes.com/search?searchTerm=mr.+beam.
(Continued)

*Primary Examiner* — Vibol Tan
(74) *Attorney, Agent, or Firm* — Li & Cai Intellectual Property (USA) Office

(57) ABSTRACT

An LED security light with an integrated motion sensor includes a PIR motion sensing unit and an LED load integrated together to become a compact lighting device. The PIR motion sensing unit is a two-portion design with a Fresnel lens either integrating with a light diffuser or as a separate piece positioned right behind the light diffuser and with a PIR motion sensor positioned at a focal point of the Fresnel lens and encircled by LEDs, wherein the Fresnel lens collects infrared ray signals generated by a moving body and remotely converges infrared ray signals on the PIR motion sensor. A signal processing circuitry decides whether the infrared ray signals represent an intrusion in order to turn on the compact lighting device. When the compact lighting device of this art is turned on, there is no shadow effect which reduces the lumens output of the security light.

10 Claims, 17 Drawing Sheets

(51) Int. Cl.

| | | |
|---|---|---|
| *F21V 5/04* | (2006.01) | |
| *H05B 47/105* | (2020.01) | |
| *F21K 9/232* | (2016.01) | |
| *F21V 23/04* | (2006.01) | |
| *F21V 19/00* | (2006.01) | |
| *F21V 15/01* | (2006.01) | |
| *F21V 21/28* | (2006.01) | |
| *H05B 45/10* | (2020.01) | |
| *H05B 47/16* | (2020.01) | |
| *F21V 23/00* | (2015.01) | |
| *F21Y 115/10* | (2016.01) | |
| *F21V 23/06* | (2006.01) | |
| *F21V 29/70* | (2015.01) | |
| *F21W 131/10* | (2006.01) | |
| *F21Y 105/10* | (2016.01) | |

(52) U.S. Cl.
CPC ............ *F21V 15/01* (2013.01); *F21V 19/001* (2013.01); *F21V 19/003* (2013.01); *F21V 21/28* (2013.01); *F21V 23/0471* (2013.01); *H05B 45/00* (2020.01); *H05B 45/10* (2020.01); *H05B 47/16* (2020.01); *F21V 23/007* (2013.01); *F21V 23/06* (2013.01); *F21V 29/70* (2015.01); *F21W 2131/10* (2013.01); *F21Y 2105/10* (2016.08); *F21Y 2115/10* (2016.08)

(58) Field of Classification Search
CPC ........ F21V 29/70; F21V 23/06; F21V 19/001; F21V 23/0471; F21V 23/007; F21V 5/04; F21K 9/232; F21Y 2115/10
See application file for complete search history.

(56) References Cited

U.S. PATENT DOCUMENTS

| | | | | |
|---|---|---|---|---|
| 6,933,854 B1* | 8/2005 | Burgess | ................... | G08B 7/06 340/691.1 |
| 6,987,267 B1* | 1/2006 | Monroe | ................... | G01J 5/04 250/342 |
| 7,327,254 B2* | 2/2008 | Chen | ................... | F21V 23/0471 340/321 |
| 7,339,471 B1* | 3/2008 | Chan | ................... | G08B 15/002 315/159 |
| 8,063,375 B2 | 11/2011 | Cobbinah et al. | | |
| 8,123,379 B2* | 2/2012 | Chen | ................... | F21V 17/02 362/249.05 |
| 9,228,731 B2* | 1/2016 | Chen | ................... | H04N 7/183 |
| 9,613,525 B2* | 4/2017 | Boyd | ................... | F24F 11/30 |
| 9,839,088 B1* | 12/2017 | Deaton | ................... | F21S 9/022 |
| 2002/0014971 A1* | 2/2002 | Ferraro | ................... | G08B 13/1409 340/689 |
| 2004/0032744 A1* | 2/2004 | Nishizawa | ................... | B60Q 1/12 362/538 |
| 2005/0184867 A1* | 8/2005 | Osann, Jr. | ................... | G05B 15/02 340/539.25 |
| 2006/0262394 A1* | 11/2006 | Peterson | ................... | G02B 13/00 359/457 |
| 2012/0044682 A1* | 2/2012 | Allen | ................... | F21V 5/045 362/241 |
| 2013/0207546 A1 | 8/2013 | Chen | | |
| 2015/0002028 A1* | 1/2015 | Chen | ................... | H05B 33/0848 315/153 |
| 2015/0214407 A1* | 7/2015 | Nakagawa | ................... | H01L 31/02008 136/246 |
| 2015/0308662 A1* | 10/2015 | Vice | ................... | F21V 14/02 362/282 |
| 2017/0321850 A1* | 11/2017 | Chien | ................... | F21V 29/20 |

OTHER PUBLICATIONS

All-Pro 270-Degree 3-Head White LED Motion-Activated Flood Light, https://www.lowes.com/pd/All-Pro-Revolve-270-Degree-3-Head-White-Integrated-LED-Motion-Activated-Flood-Light/999978172.

* cited by examiner

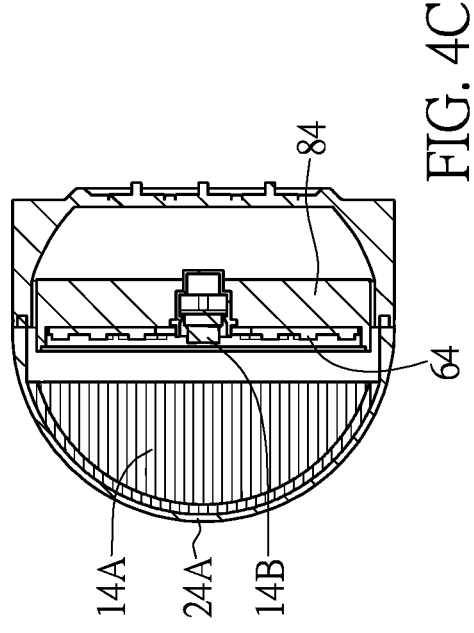
FIG. 4A
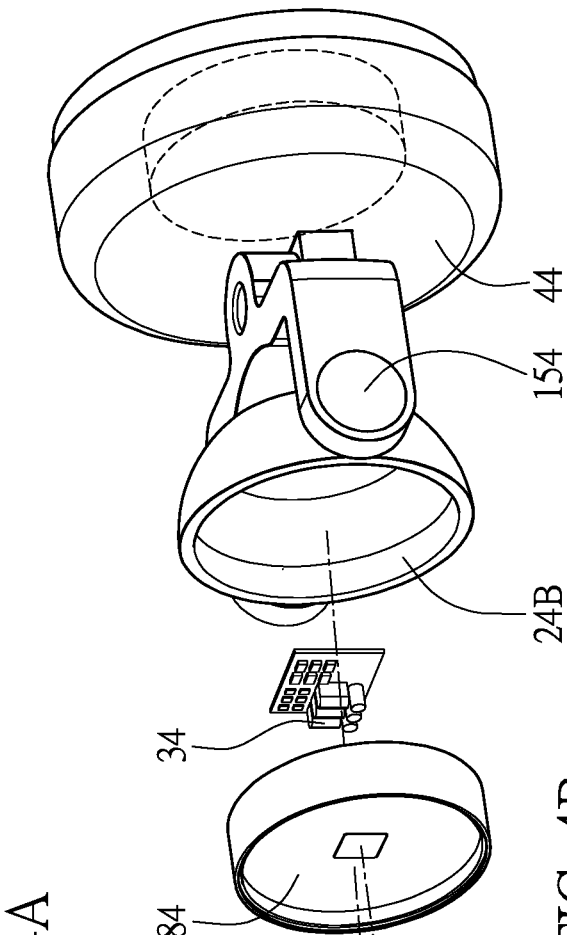
FIG. 4C
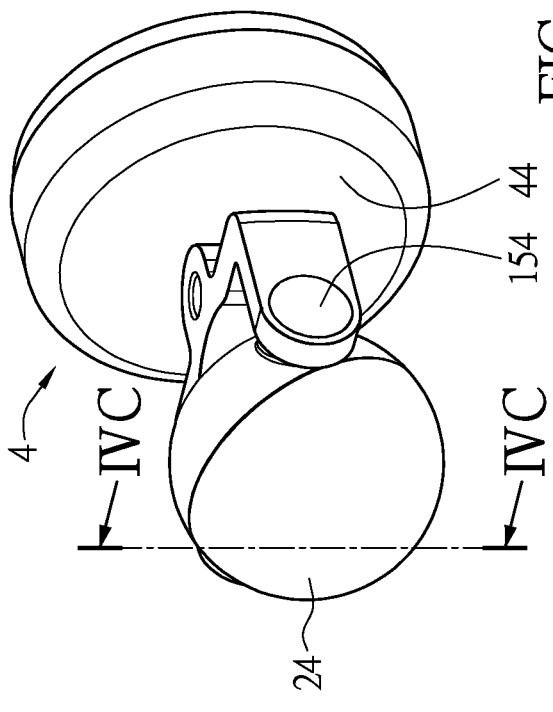
FIG. 4B
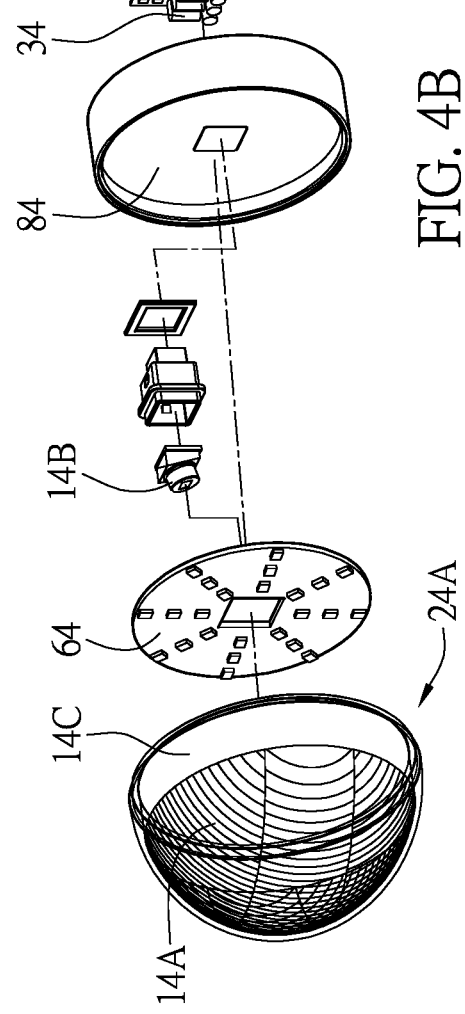

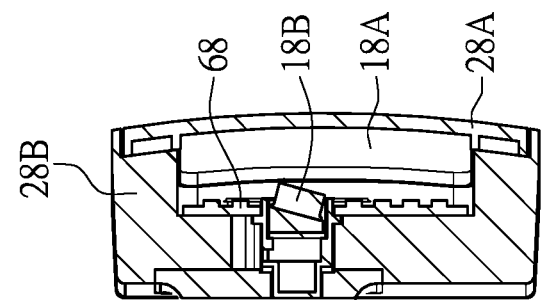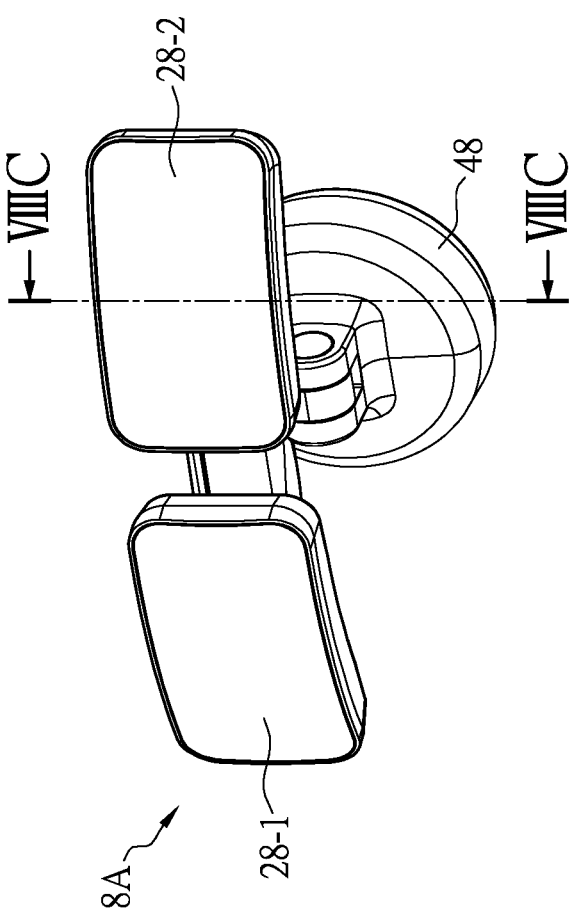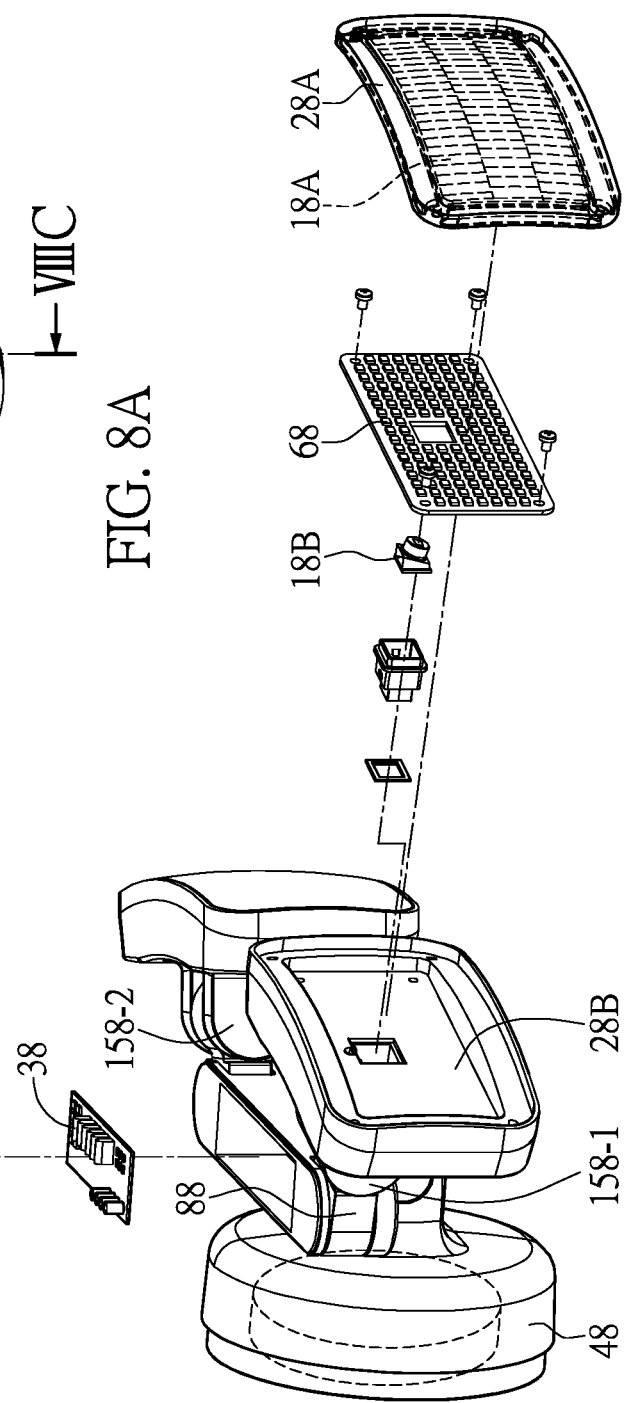

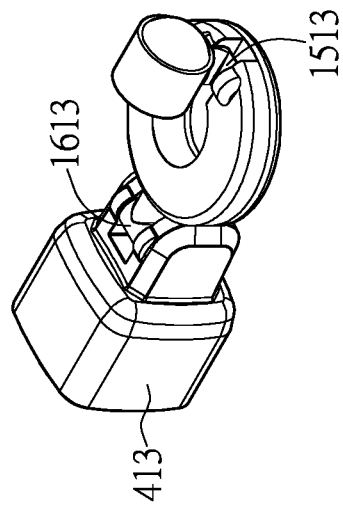
FIG. 13E
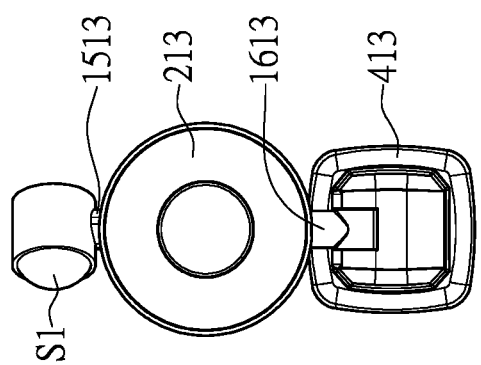
FIG. 13F
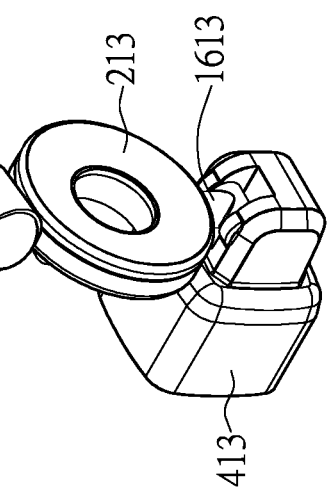
FIG. 13C
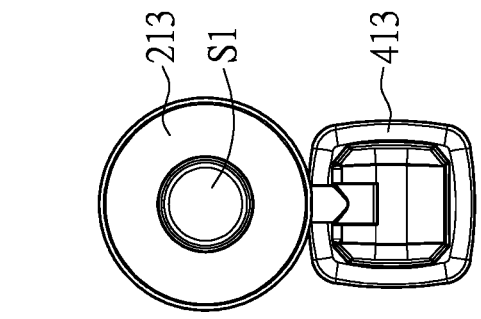
FIG. 13D
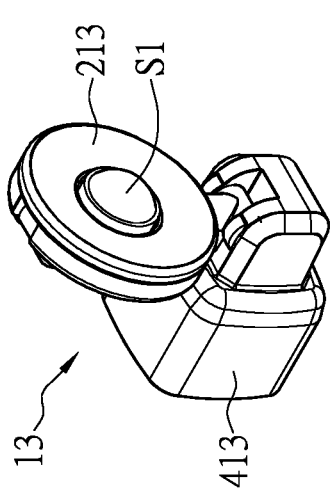
FIG. 13A
FIG. 13B

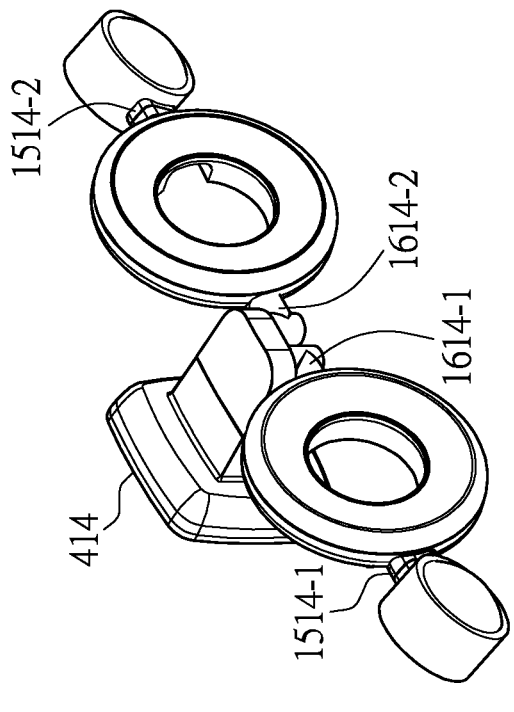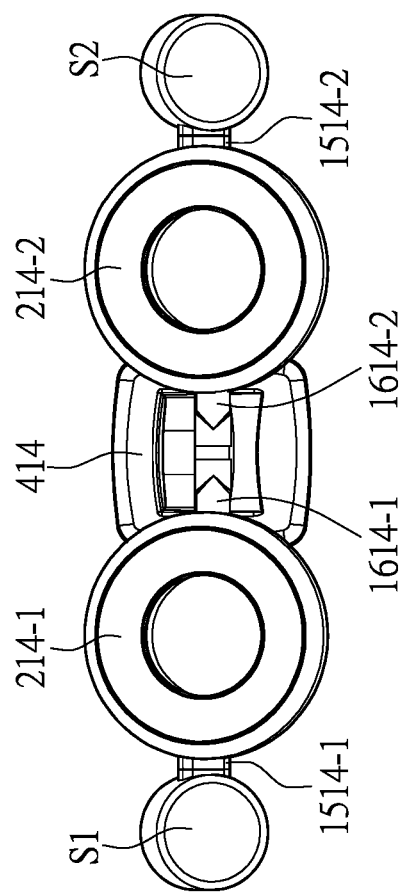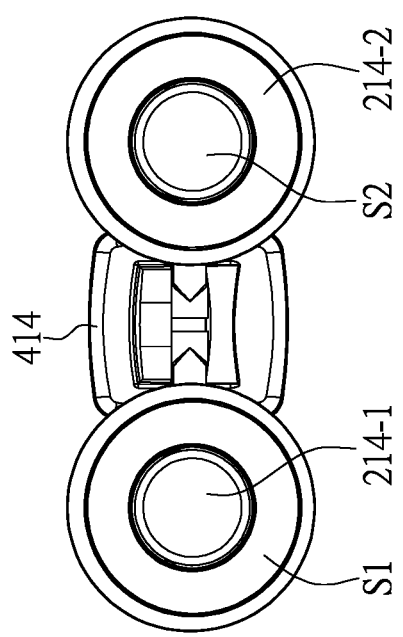

LED SECURITY LIGHT WITH INTEGRATED MOTION SENSOR AND MOTION SENSING LIGHTING SYSTEM

CROSS-REFERENCE TO RELATED PATENT APPLICATION

This application claims priority from the U.S. Provisional Patent Application Ser. No. 62/605,525 filed Aug. 17, 2017, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The technical field of the present disclosure is an LED security light configured with a passive infrared sensor installed inside a lamp housing of an LED lamp and structurally integrated with a light diffuser and an LED light emitting unit for performing a motion activated illumination.

BACKGROUND OF THE DISCLOSURE

A security light based on motion sensing with PIR (passive infrared) motion sensor is traditionally configured with three operating units to perform its function and provides a motion activated illumination. The three operating units are a light emitting unit, a PIR motion sensing unit and a power control unit. The power control unit is typically installed inside a wall mounted junction box which is further installed on an electric outlet. The light emitting unit and the PIR motion sensing unit are externally and separately installed on the junction box, both are electrically coupled to the power control unit inside the junction box.

The PIR motion sensing unit includes a condensing lens and a PIR motion sensor. The condensing lens may be a Fresnel lens, a dot lens or others. The Fresnel lens through its dimension and structural design collects and remotely converges IR (infrared) ray signals into a focal point where the PIR motion sensor is positioned to receive the focused IR ray signals generated from a moving body. The PIR motion sensor in conjunction with an IR ray signal detection circuitry detects and decides if the IR ray signals received represents a motion signal and outputs a voltage signal to the power control unit to turn on the light emitting unit for performing an illumination mode for a preset time duration before being turned off. The PIR motion sensing unit is typically connected to the junction box through an angle adjustable structure, such that it can be adjusted to a direction requiring detection of motion intrusion occurrence and the light emitting unit is accordingly turned on to achieve a purpose of security protection. A PIR motion sensing security light configured as above is characterized with a wide and adjustable detection angle, a capacity to perform a high lumens output and a long detection distance. One shortage is that, when the PIR motion sensing security light is used for indoor applications, such as in a storage room or in a basement, the assembly of the PIR motion sensing security light is a bit too bulky and may not be conveniently used for indoor applications as for outdoor applications. In addition, people generally do not need very high illumination level for security protection like the outdoor living need.

A related art U.S. Pat. No. 7,327,254B2 disclosed a PIR light bulb with sensing function to improve an installation convenience, however it reduced detection scope, loss of detection direction adjustable feature and lower lumens output for application of small space automatic lighting control. Further, the related art packaged three operating units together to form a convenient single compact piece in a shape of a light bulb design while keeping their functions independently performed with a reduced capacity. The three operating units, which include an LED (light emitting diode) light emitting unit, a PIR motion sensing unit and a power control unit, are scaled down to a mini scale and installed inside a hollow light bulb housing made of a glass or a plastic material. The light bulb housing also serves as a light diffuser for scattering and transmitting light emitted from the LED light emitting unit and is further constructed with a metallic screw-in lamp cap for adapting to an AC power source. The PIR motion sensing unit is positioned along a central space of the light bulb housing. The bottom of the PIR motion sensing unit is surrounded by LEDs (light emitting diodes) of the light emitting unit, and the top of the PIR motion sensing unit is configured with a small Fresnel lens slightly protruding out of the shell surface of the light bulb housing for receiving IR ray signals generated from an intruder. The detection angle and detection distance of the PIR motion sensor are determined by the curvature and surface area of the Fresnel lens designed. Since the Fresnel lens of the related art is substantially sized down to become a mini PIR motion sensing unit, the PIR light bulb is configured and limited to a much smaller detection angle and much shorter detection range. In addition, the PIR motion sensing unit is an opaque packaged component which is positioned along the central line of the light bulb housing, and therefore it creates a shadow effect in the center of the PIR light bulb. When the PIR light bulb is triggered to be turned on by the PIR motion sensing unit to emit LED light, the LED light therefore is partially blocked by the body of the PIR motion sensing unit. This arrangement in fact is a dilemma between optimizing a detection capacity and optimizing an illumination capacity. The larger the Fresnel lens is designed, the larger the shadow area blocks the illumination of the PIR light bulb.

To remedy the loss of the adjustable feature of the detection direction, the inventor of the above related art further disclosed a technology in U.S. Pat. No. 8,123,379B2 granted Feb. 28, 2012 in which a Fresnel lens detection head is redesigned to become an eyeball construction such that the Fresnel lens detection head becomes angle adjustable. It only improves the detection capacity of the PIR light bulb to a limited extent because the fundamental issue is still the conflicting constraint of choosing an adequate dimension of the Fresnel lens between maximizing a detection scope and minimizing the shadow effect blocked by the PIR motion sensing unit positioned in the central space of the PIR light bulb.

The PIR motion sensor reacts only to a moving IR source or a moving heat radiation object. A fixed heat source, even with a time variation in its intensity, does not trigger the PIR motion sensor to generate a PIR motion signal. For such reason, when the PIR motion sensor and an LED array are arranged together behind a light diffuser, the heat generated from LEDs will not affect a normal function of the PIR motion sensor in principle. Since there is no virtual need to maintain a direct touch connection between the Fresnel lens and the PIR motion sensor, it is hence feasible to knock down conventional one-piece structure of the PIR motion sensing unit into two mutually separated and remotely located components without affecting the functional performance of the PIR motion sensor. The Fresnel lens can be designed to integrate with the light diffuser or can be designed as a separate piece located behind the light diffuser, and on the other hand, the PIR motion sensor can be remotely located at a focal point on which the focused IR ray signals collected by the Fresnel lens are converged and surrounded by the LEDs. With such arrangement, the size and curvature of the Fresnel lens can be enlarged to maximize detection scope and detection distance, and there is no more solid body to block the LED light to cause a shadow problem. This is the technical background of the present disclosure which can release the constraint of Fresnel lens design and also eliminate the shadow problem.

SUMMARY OF THE DISCLOSURE

In response to the above-referenced technical inadequacies, the present disclosure provides a technology to eliminate the drawbacks of the above mentioned two related arts related to a construction of a PIR light bulb. The application of the present disclosure to a light bulb based construction is only one embodiment of the present disclosure. Regardless applications in any PIR based lighting devices, the key technology of the present disclosure is the knock down of a traditional PIR motion sensing unit into two separated components, namely, the Fresnel lens and the PIR motion sensor, which do not need to be packaged together as one operating component. The PIR motion sensor is managed to be surrounded by the LEDs of an LED light emitting unit and is located at a focal point where the IR ray signals collected by the Fresnel lens are converged and focused on. The Fresnel lens is either integrated with a light diffuser to become a part of the light diffuser or a separate piece located right behind the light diffuser to perform IR ray signal collecting function. The Fresnel lens, the PIR motion sensor, the LEDs and a power control unit are all accommodated in a lamp housing to become a compact design. The PIR light bulb is designed with a screw-in lamp cap for directly adapting to an AC power source to perform a motion activated illumination. While the PIR light bulb so configured provides an advantage of convenience, it remains not being able to communicate with other PIR light bulb in an assembly of two or more PIR light bulbs being configured to perform a multi-directional motion detection to synchronously turn on all PIR light bulbs at once. However, this can be improved by using a three-way socket configuration in which a third wire can transmit a turn-on message to a central controller to synchronously turn on all other PIR light bulbs in the assembly. With such arrangement, one motion intrusion detected by one of a plurality of PIR light bulbs pointing to different directions can trigger all PIR light bulbs to be turned on synchronously.

According to the present disclosure, an LED lamp housing accommodating a Fresnel lens, a PIR motion sensor, an LED light emitting unit and a power control circuitry is configured with a two-piece housing construction divided into a first part housing and a second part housing. The first part housing serves both as a light diffuser and as a cover to protect the operating components inside the LED lamp housing. The Fresnel lens is designed to incorporate with the first part housing in two ways. The first way is to build the Fresnel lens in the light diffuser to integrate with the surface of the first part housing to collect IR ray signals generated from an intruder. The second way is to install a separate piece of Fresnel lens positioned behind the first part housing. The Fresnel lens positioned behind the first part housing can be made with a clear IR ray receptive material to avoid any shadow effect, preferably using HDPE (high density polyethylene) which performs an excellent physical reception feature to an infrared ray. Both ways can successfully collect and converge IR ray signals remotely on a focal point in a central space of the second part housing where PIR motion sensor is positioned to receive condensed IR ray signals. The second part housing accommodates all other operating components except the Fresnel lens. The PIR motion sensor is positioned in the center space of the second part housing at the focal point to receive converged IR ray signals collected by the remotely located Fresnel lens in the first part housing space and is further surrounded by light emitting LEDs with a heat dissipating sink, the PIR motion sensor together with an IR ray signal detection circuitry is packaged with a heat insulating material to protect the PIR motion sensor and the IR ray signal detection circuitry from exposing to an unexpected high temperature environment which could affect the sensitivity of the PIR motion sensor and the IR ray signal detection circuitry. The PIR motion sensor together with the IR ray signal detection circuitry is not much taller in construction than the surrounding LEDs, and therefore, it does not create any shadow effect.

The first part housing and the second part housing are fastened together through a connection mechanism. For a bulb housing construction, the first part housing and the second part housing could be coupled and fastened by twisting a threaded construction respectively designed on the connecting edges of the first part housing and the second part housing or by using an ultrasonic welding technology. For a non-bulb shaped lamp housing, the first part housing and the second part housing could be coupled and fastened together by screws or any similar means. However, the connection mechanism can be any other method which can fasten the first part housing and the second part housing together without restriction. So configured the present disclosure has advantages compared with the above two related arts in terms of much wider detection scope, longer detection range and a high illumination output without a shadow effect. The present disclosure when compared with a traditional PIR motion sensing security light also has two advantages; the first advantage is a more compact product structure without a bulky PIR motion sensing unit, wherein the PIR motion sensor instead is built inside a lamp housing of the PIR motion sensing security light. The second advantage is a multi-directional detection capacity when an assembly of two or more such PIR built-in lamps are configured and integrated as a security lighting system with each member sensing lamp designed and connected to an individual angle adjustable means, the security lighting system can effectively detect multi-directional motion intrusion(s) and synchronously turn on and turn off all security lamps at once. The detection capacity of such security lighting assembly is quite enormous, which is virtually impossible for a traditional security light configured with two or more light emitting units as it has only one external PIR motion sensor installed and it can only be adjusted to one direction for detection with an angle coverage. It is virtually impractical or functionally inefficient to install a second or a third conventional external PIR motion sensor to achieve same functional performance besides being too bulky looking.

BRIEF DESCRIPTION OF THE DRAWINGS

The present disclosure will become more fully understood from the detailed description and the accompanying drawings, in which:

FIG. 4A to FIG. 4C are a perspective view, an exploded view and a cross-sectional view of a second embodiment with the security light being an eyeball-shaped motion sensing lamp of the present disclosure, respectively.

FIG. 7A to FIG. 7C are a perspective view, an exploded view and a cross-sectional view of a fifth embodiment with the motion sensing light being a bowl-shaped motion sensing lamp of the present disclosure, respectively.

FIG. 8A to FIG. 8C are a perspective view, an exploded view and a cross-sectional view of sixth embodiment of the present disclosure with the security light having two rectangular shaped motion sensing lamps, respectively.

FIG. 13A to FIG. 13B are a perspective view and a front view of an eleventh embodiment of the security light having a donut-shaped LED lamp and an adjustable PIR motion sensing unit being embedded in the LED lamp according to the present disclosure, respectively.

FIG. 13C and FIG. 13D are a perspective view and a front view of the eleventh embodiment of the present disclosure, wherein the PIR motion sensing unit is rotated to a top of the LED lamp and the LED lamp illuminates horizontally.

FIG. 13E and FIG. 13F are a perspective view and a front view of the eleventh embodiment of the present disclosure, wherein the PIR motion sensing unit is rotated to a back of the LED lamp and the LED lamp illuminates vertically.

FIG. 14A and FIG. 14B are a perspective view and a front view of a twelfth embodiment of the security light having two head donut shaped LED lamps and two adjustable PIR motion sensing units being integrated in the two LED lamps according to the present disclosure, respectively.

FIG. 14C and FIG. 14D are a perspective view and a front view of the twelfth embodiment of the present disclosure, wherein the two PIR motion sensing units are rotated to an outer side of the two LED lamps, respectively.

DETAILED DESCRIPTION OF THE EXEMPLARY EMBODIMENTS

Figure 1B:
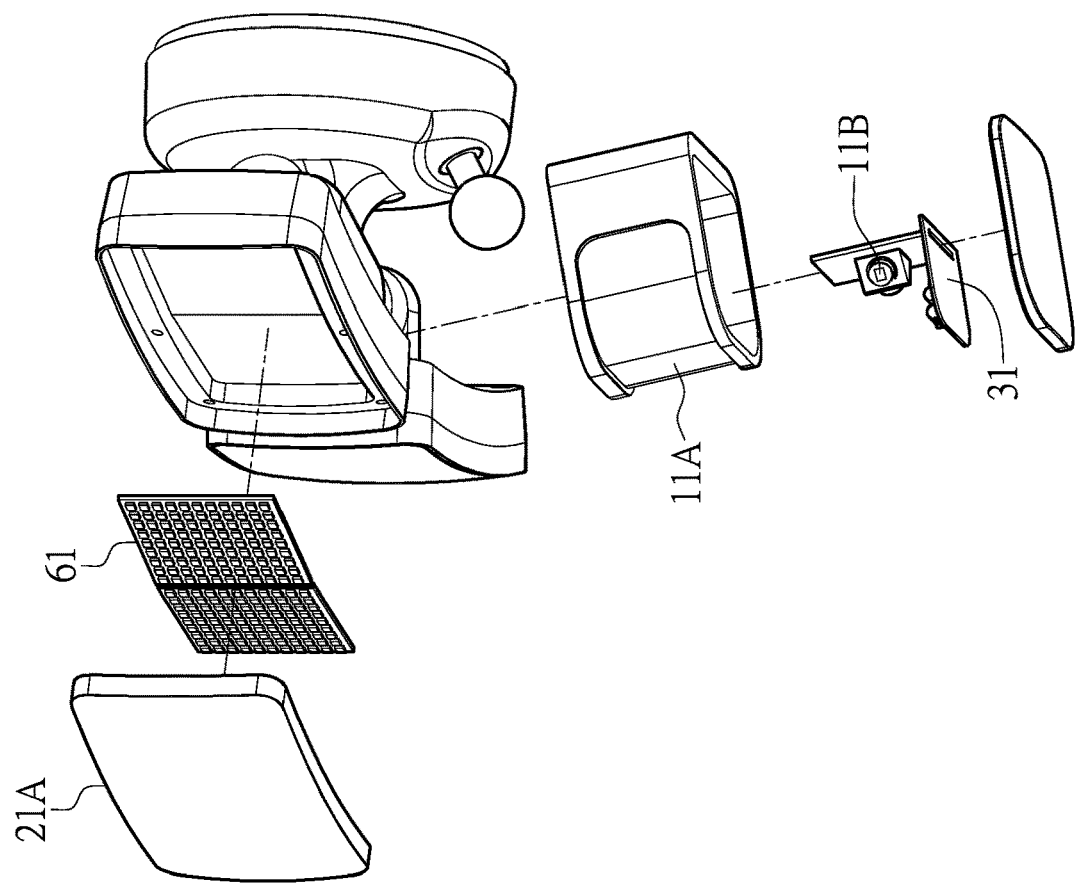
FIG. 1A and FIG. 1B are a perspective view and an exploded view of a traditional PIR motion sensing security light.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1A:
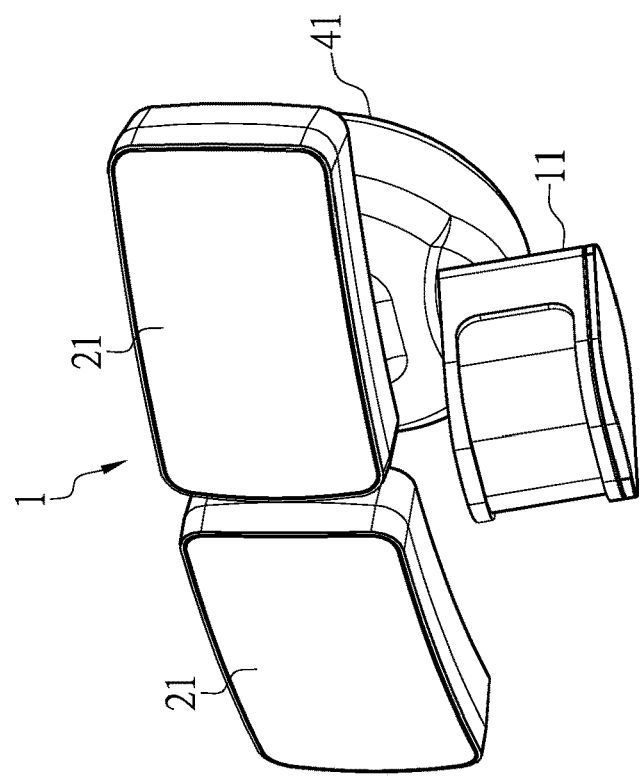

Referring to FIG. 1A and FIG. 1B, which are a perspective view and an exploded view of a traditional PIR motion sensing security light 1 which includes two LED lamps 21, one PIR motion sensing unit 11 and a power control unit installed and hidden inside a junction box 41 to be mounted and fastened to a wall electric outlet (not shown). The traditional PIR motion sensing security light 1 is characterized that, the PIR motion sensing unit 11 is an integrated piece of a condensing lens 11A and a PIR motion sensor 11B to collect IR ray signals generated by a human body, converge the IR ray signals on the PIR motion sensor 11B. An IR ray signal detection circuitry 31 decides if the IR ray signals received represent a motion intrusion, and then operates to generate a motion sensing signal to the power control unit in a junction box 41 to turn on the two LED lamps 21. A plurality of LEDs (light emitting diodes) 61 are mounted on a circuit board installed inside each housing of the two LED lamps behind a light diffuser 21A. Both the LED lamps 21 and the PIR motion sensing unit 11 are separately mounted on the junction box 41 and separately connected to the power control unit to perform a motion activated illumination.

Figures 2A, 2B:
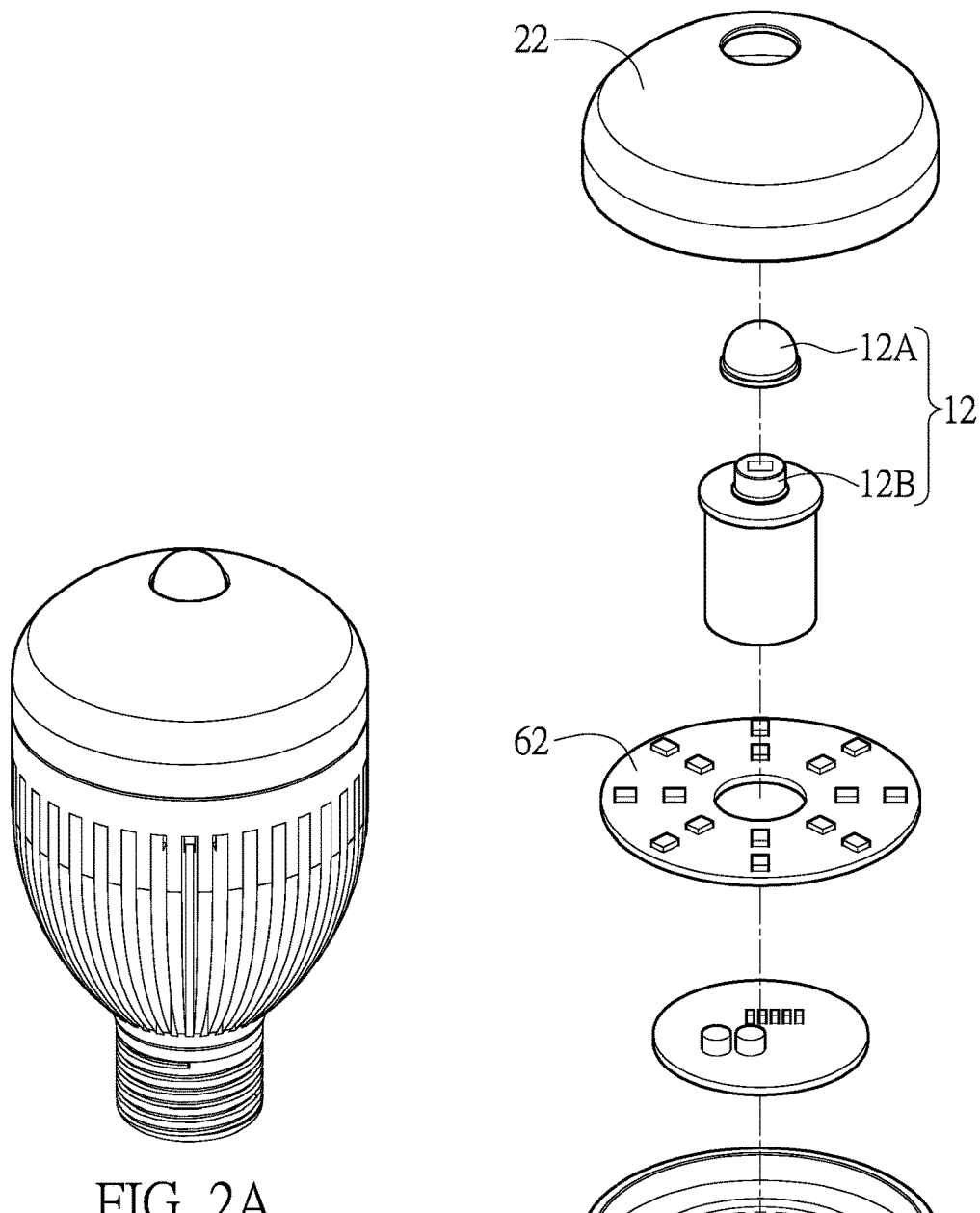
FIG. 2A and FIG. 2B are a perspective view and an exploded view of a security light being a PIR light bulb of U.S. Pat. No. 7,327,254 B2.

FIG. 2A and FIG. 2B are a perspective view and an exploded view of U.S. Pat. No. 7,327,254 B2 for a PIR LED light bulb including a perspective view, an exploded view and a section view, the related art was invented to modify the traditional PIR based motion sensing security light for indoor application to improve an installation convenience at a cost of reducing detection capacity and lower lumens output by scaling down each operating unit of the traditional PIR motion sensing security light to a mini size in order to package them together to form a compact construction. The construction is made with a mini motion sensing unit 12 being positioned along a central line of an accommodating bulb housing 82 with its bottom end surrounded by an array of LEDs 62 and its top end designed with a Fresnel lens 12A protruding out of a light diffuser 22 through an opening of the bulb housing 82. In this related art, the Fresnel lens 12A and a PIR motion sensor 12B are packaged together as the mini motion sensing unit 12. With such configuration, the compact construction has two drawbacks in exchanging for a benefit of installation convenience. The inventor therefore invented another technology to improve the detection capacity in U.S. Pat. No. 8,123,379B2 granted on Feb. 28, 2012 in which a technology was disclosed to restructure the mini motion sensing unit into an eyeball construction such that a detection direction can be adjusted to improve its detection capacity to make up the shortcoming of the small detection scope. The fundamental constraint of the Fresnel lens is too small to provide a broad and deep enough detection scope, and the shadow effect of lumens output blocked by the mini motion sensing unit installed in the middle of the bulb housing remains unresolved.

Figure 3A:
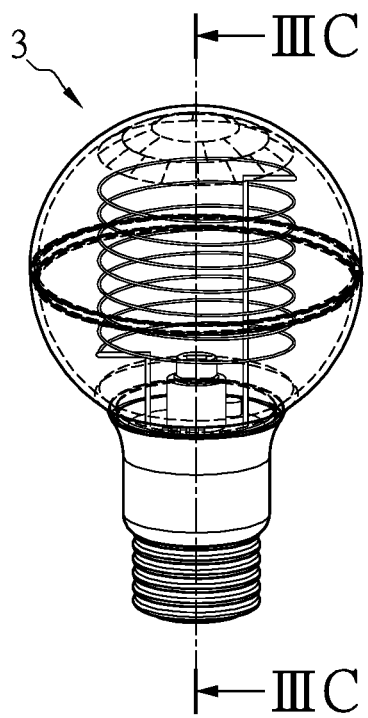
FIG. 3A to FIG. 3C are a perspective view, an exploded view and a cross-sectional view of a first embodiment with the security light being a light bulb construction and a Fresnel lens being integrated with a light diffuser of the present disclosure, respectively.
Figure 3B:
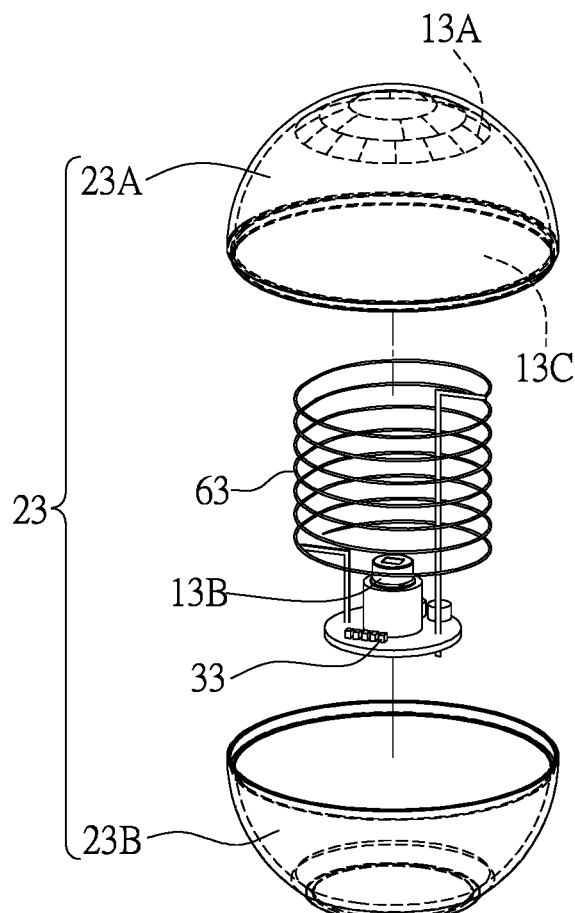
Figure 3C:
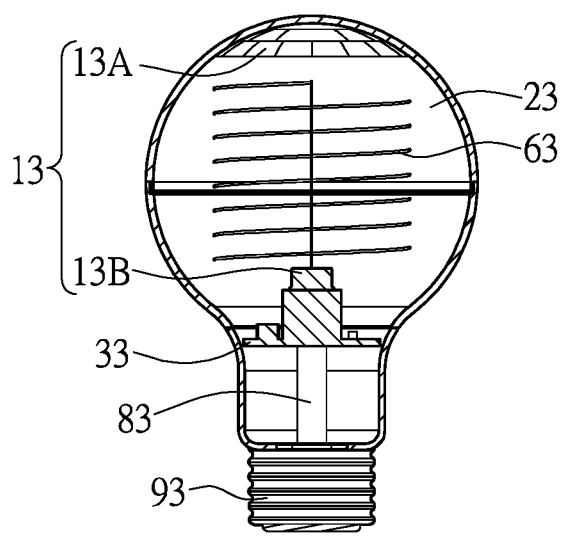

FIG. 3A to FIG. 14D are various exemplary embodiments of the present disclosure characterized with all merits of the traditional PIR motion sensing security light and the above mentioned PIR light bulb while their respective drawbacks are skillfully eliminated for both outdoor and indoor applications. FIG. 3A to FIG. 3C illustrate a first embodiment of a PIR LED light bulb of the present disclosure. The PIR LED light bulb of the present disclosure is different from the above cited related arts; unlike the above cited PIR light bulbs which simply scaled down the operating components of a traditional PIR security light and then configured them together to form a light bulb construction. In this embodiment, the PIR LED light bulb 3 is a compact device which integrates three operating components, namely, PIR motion sensing unit 13, light emitting unit 63 and power control unit 33, in an accommodating light bulb housing 23 divided into a first part housing 23A and a second part housing 23B. The PIR motion sensing unit 13 is knocked down to two operating components including a Fresnel lens 13A and a PIR motion sensor 13B. The Fresnel lens 13A is built on the central surface of the first part housing 23A and is integrated with the first part housing 23A to perform collection of IR ray signals generated by a motion intrusion as well as light diffusion for the light generated by a light emitting unit 63. The Fresnel lens 13A collects IR ray signals and converges the IR ray signals toward a focal point where the PIR motion sensor 13B is positioned to receive the IR ray signals. The PIR motion sensor 13B is installed in a central location in an accommodating space formed by the second part housing 23B and is surrounded by an LED module of the light emitting unit 63. The LED module and the PIR motion sensor 13B are respectively attached to a base 83 through their respective circuit boards. A heat sink is also attached to the circuit board of the LED module for dissipating heat generated by the LED module of the light emitting unit 63. The PIR motion sensor 13B is additionally protected by a heat insulating material such that it can operate stably. The power control unit 33 is installed in a space behind the base 83 in an accommodating space and is electrically connected to the LED module 63 for controlling a transmission of electric power delivered to the LED module of the light emitting unit 63. The first part housing 23A and the second part housing 23B are fastened together through a fastening mechanism, wherein the fastening mechanism can be an adhesive, a twist lock construction such as a threaded structure designed on a connecting edge of the first part housing 23A and another threaded structure designed on the connecting edge of the second part housing 23B, a push to lock construction or an ultrasonic welding method. In addition, it is required that the condensing Fresnel lens 13A is made with a material which is both IR ray and LED light receptive and penetrable such that the LED light is not blocked by the material of the condensing Fresnel lens 13A.

With such configuration, the PIR LED light bulb 3 of the present disclosure does not have the two drawbacks of the U.S. Pat. No. 7,327,254 B2. The Fresnel lens 13A can be expanded to a sizable portion of the surface of the light diffuser 23A to perform a large scope and long-range motion detection, therefore the shadow effect of the two related arts caused by the PIR motion sensing unit 13 located along the center of the PIR LED light bulb can be eliminated. According to such configuration, when the PIR motion sensor 13B operating with an IR ray signal detection circuitry determines that the IR ray signals collected by the Fresnel lens 13A represent a motion intrusion, the IR ray signal detection circuitry consequently outputs a motion sensing signal to a controller of the power control unit 33 which in turn generates a control signal to conduct a switching device to transmit an electric power to the LED module of the light emitting unit 63 to turn on the PIR LED light bulb 3 for a predetermined time duration. In the absence of further motion intrusion detected, the security light is then automatically shut off.

With such configuration, the light diffuser 23A is constructed with two portions. The first portion is the Fresnel lens 13A being located in the center or any part of the light diffuser 23A, and the second portion is the remaining surface 13C surrounding the Fresnel lens 13A. The Fresnel lens 13A is made of a material which is both IR ray and LED light penetrable to serve a dual function of IR ray collection and LED light diffusion. The light diffuser 23A can be constructed with two configurations. The first configuration is a direct forming construction wherein the whole light diffuser 23A is made of both IR ray and LED light penetrable plastic material with a pattern of the Fresnel lens being stamped on or printed on the first portion of the light diffuser 23A. The second configuration is a two-step construction process, wherein the first portion 13A of the light diffuser 23A is separately fabricated with a Fresnel lens pattern thru a plastic injection process and the light diffuser 23A is punched with a central space to form the second portion 13C of the light diffuser 23A. The first portion 13A of the light diffuser 23A and the second portion 13C of the light diffuser 23A are then integrated through a bonding process.

Similar to the above-cited conventional arts, the PIR LED bulb 3 of the present disclosure is also designed with a screw-in head 93 for directly adapting to an AC power socket.

FIG. 4A to FIG. 4C illustrate a second embodiment of an LED security light of the present disclosure. The LED security 4 includes an eyeball-shaped motion sensing LED lamp 24, an angle adjustment device 154 connected with the eyeball-shaped motion sensing LED lamp 24 and a junction box 44 connected with the angle adjustment device 154. A PIR motion sensing unit is knocked down into two operating components including a Fresnel lens 14A and a PIR motion sensor 14B. The eyeball-shaped motion sensing LED lamp 24 is configured with a lamp housing with an accommodating space formed by a first part housing 24A and a second part housing 24B to accommodate the Fresnel lens 14A, the PIR motion sensor 14B, a light emitting unit 64 including a plurality of LEDs and a power control unit 34. The first part housing 24A is a partial spherical shell primarily designed for performing LED light diffusion. The Fresnel lens 14A is built on a central surface of the first part housing 24A and is integrated with the first part housing 24A to perform collection of IR ray signals generated by a motion intrusion as well as light diffusion for the LED light generated by the light emitting unit 64. The Fresnel lens 14A collects IR ray signals and converges the IR ray signals toward a focal point where the PIR motion sensor 14B is positioned to receive the IR ray signals. The PIR motion sensor 14B is installed in a central location in an accommodating space formed by the second part housing 24B and is surrounded by an LED module of the light emitting unit 64. The LED module of the light emitting unit 64 and the PIR motion sensor 14B are respectively attached to a base 84 through their respective circuit boards. A heat sink is also attached to the circuit board of the LED module for dissipating heat generated by the LED module 64. The PIR motion sensor 14B is additionally protected by a heat insulating material such that a signal processing circuitry electrically connected with the PIR motion sensor 14B can operate stably. The power control unit 34 is installed in a space behind the base 84 in the accommodating space formed by the second part housing 24B and is electrically connected to the LED module of the light emitting unit 64 for controlling a transmission of electric power delivered to the LED module of the light emitting unit 64. The first part housing 24A and the second part housing 24B are fastened together through a fastening mechanism. The fastening mechanism can be an adhesive, a twist lock construction, such as a threaded structure designed on a connecting edge of the first part housing 24A and another threaded structure designed on the connecting edge of the second part housing 24B, a push to lock construction or an ultrasonic welding method. In addition, it is required that at least the Fresnel lens 14A is made with a material which is both IR ray and LED light receptive and penetrable such that the LED light is not blocked by the material of the Fresnel lens 14A.

When the PIR motion sensor 14B operating with the signal processing circuitry determines that the IR ray signals collected by the Fresnel lens 14A represent a motion intrusion, the signal processing circuitry consequently outputs a motion sensing signal to a controller of the power control unit 34 which in turn generates a control signal to conduct a switching device to transmit an electric power to the LED module of the light emitting unit 64 to turn on the LED security light 4. In the absence of further motion intrusion detected, the security light is then automatically shut off.

With such configuration, the light diffuser 24A is constructed with two portions. The first portion is the Fresnel lens 14A being located in the center or any part of the light diffuser 24A, and the second portion is the remaining surface 14C surrounding the Fresnel lens 14A. The Fresnel lens 14A is made of a material which is both IR ray and LED light penetrable to serve a dual function of IR ray collection and LED light diffusion. The light diffuser 24A can be constructed with two configurations. The first configuration is a direct forming construction wherein the whole light diffuser 24A is made of both IR ray and LED light penetrable plastic material with a pattern of the Fresnel lens being stamped on or printed on the first portion 14A of the light diffuser 24A. The second configuration is a two-step construction process, wherein the first portion of the light diffuser is separately fabricated with a Fresnel lens pattern thru a plastic injection process and the light diffuser 24A is punched with a central open space to form the second portion 14C of the light diffuser 24A. The first portion 14A of the light diffuser 24A and the second portion 14C of the light diffuser 24A are then integrated through a bonding mechanism.

The angle adjustment device 154 provides a capacity for making both a vertical and a horizontal adjustment of detection direction of the eyeballed shaped motion sensing LED lamp. The angle adjustment device is also designed to provide wiring channel for transmission of power supply and sensing signals.

The junction box 44 offers facility to install and fasten the LED security light 4 on a wall electric outlet to perform a lighting solution for security protection. The junction box provides an accommodating space to accommodate a power supply unit to output DC or AC power for operating the LED security light and optionally the power control unit 34 may be located in the junction box incorporating with a few external control devices for adjusting and setting various operating parameters such as a light-on duration activated by the PIR motion sensor 14B, a sensitivity or a detection range of the PIR motion sensor 14B or an illumination level of the LED security light 4 turned on by the PIR motion sensor 14B.

Figure 5A:
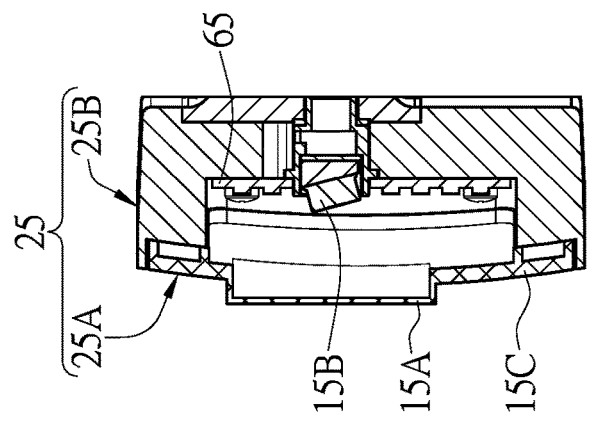
FIG. 5A to FIG. 5C are a perspective view, an exploded view and a section view of a third embodiment with the security light being a rectangular shaped motion sensing lamp of the present disclosure, respectively.
Figure 5C:
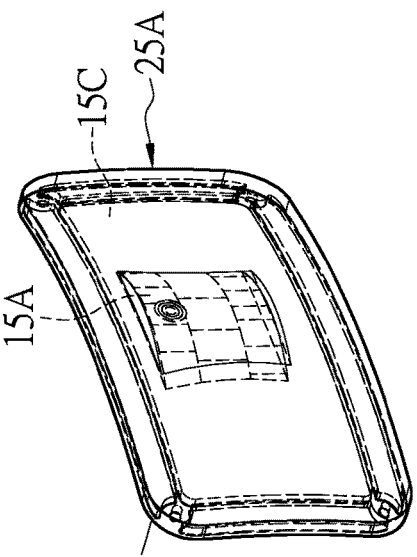
Figure 5B:
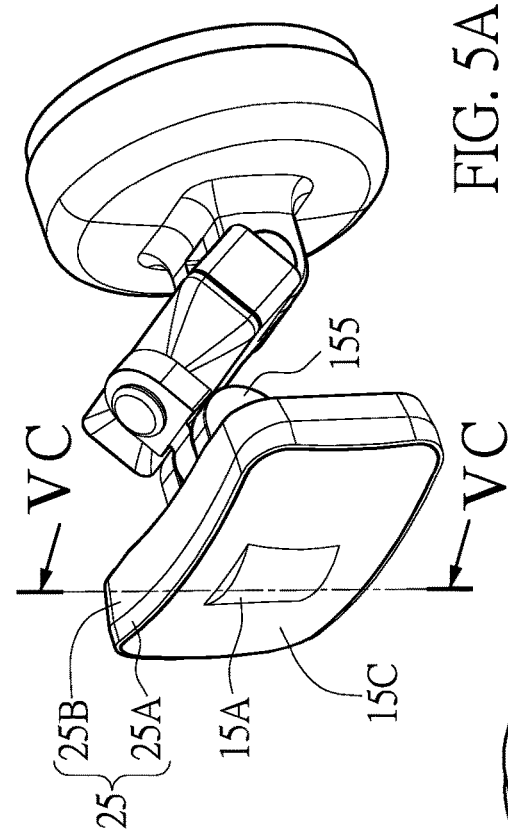
Figure 5B:
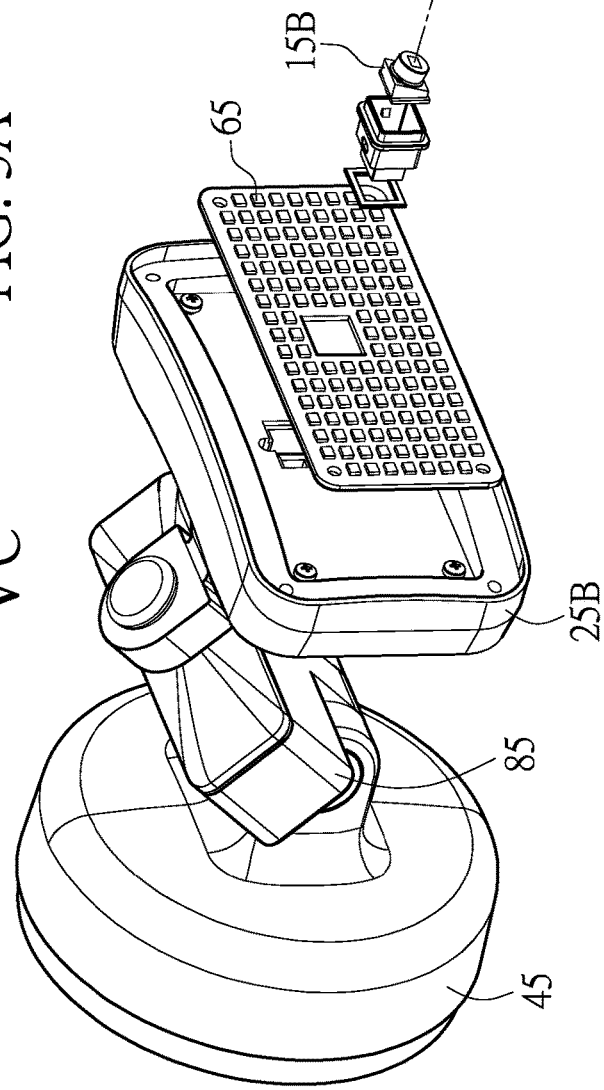

FIG. 5A to FIG. 5C illustrate another embodiment of a LED security light of the present disclosure. The LED security light 5 includes a rectangular shaped motion sensing LED lamp 25, an angle adjustment device 155 connected with the rectangular shaped motion sensing LED lamp 25 and a junction box 45 connected with the angle adjustment device 155. A traditional PIR motion sensing unit is knocked down into two operating components including a Fresnel lens 15A and a PIR motion sensor 15B. The rectangular shaped motion sensing LED lamp 25 is configured with a lamp housing with an accommodating housing space formed by a first part housing 25A and a second part housing 25B to accommodate the Fresnel lens 15A, the PIR motion sensor 15B, a light emitting unit 65 including a plurality of LEDs and a power control unit (not shown). The first part housing 25A is a rectangular panel primarily designed for diffusing LED light generated by the light emitting unit 65. The Fresnel lens 15A is built on a first portion of the first part housing 25A and is integrated with the first part housing 25A for performing collection of IR ray signals generated from a motion intrusion as well as light diffusion for LED light generated by the light emitting unit 65. The Fresnel lens 15A collects IR ray signals and converges the IR ray signals toward a focal point where the PIR motion sensor 15B is positioned to receive the IR ray signals. The PIR motion sensor 15B is installed at a location in an accommodating space formed by the second part housing 25B and is surrounded by an LED module of the light emitting unit 65. The LED module of the light emitting unit 65 and the PIR motion sensor 15B are respectively attached to the second part housing 25B through their respective circuit boards. A heat sink is also attached to the circuit board of the LED module for dissipating heat generated by the LED module of the light emitting unit 65. The PIR motion sensor 15B is additionally wrapped with a heat insulating material such that an IR ray signal detection circuitry electrically connected with the PIR motion sensor 15B can operate in an environment with a stable temperature. The power control unit (not shown) is installed in a control box 85 behind the second part housing 25B and is electrically connected to the LED module of the light emitting unit 65 for controlling a transmission of electric power delivered to the LED module of the light emitting unit 65. The first part housing 25A and the second part housing 25B are fastened together through a fastening mechanism, wherein the fastening mechanism can be an adhesive, a press to lock device, a plurality of screws or any other fastening device. In addition, it is required that the Fresnel lens 15A is made with a material which is both IR ray and LED light receptive and penetrable such that the LED light is not blocked by the Fresnel lens 15A. The shape of the Fresnel lens 15A can be designed in different patterns as needed for maximizing a detection function.

With such configuration, when the PIR motion sensor 15B operating with the signal processing circuitry determines that the IR ray signals collected by the Fresnel lens 15A represent a motion intrusion, the signal processing circuitry consequently outputs a motion sensing signal to a controller of the power control unit which in turn generates a control signal to conduct a switching device to transmit an electric power to the LED module of the light emitting unit 65 to turn on the LED security light 5. In the absence of further motion intrusion detected, the security light 5, is then automatically shut off.

With such configuration, the light diffuser 25A is divided into two portions. The first portion is the Fresnel lens 15A located in the central area or any part of the light diffuser 25A and the second portion is the remaining area 15C surrounding the Fresnel lens 15A. The Fresnel lens 15A is made of a material which is both IR ray and LED light penetrable to serve a dual function of IR ray collection and LED light diffusion. The light diffuser 25A can be constructed with two configurations. The first configuration is a direct forming construction wherein the whole light diffuser 25A is made of IR ray and LED light penetrable material with a pattern of the Fresnel lens being stamped on or printed on the first portion 15A of the light diffuser 25A, the second configuration is a two-step construction process, wherein the first portion of the light diffuser is separately fabricated with a Fresnel lens pattern thru a plastic injection process and the light diffuser 25A is punched with a central open space to form the second portion 15C of the light diffuser 25A. The first portion 15A of the light diffuser 25A and the second portion 15C of the light diffuser 25A are then integrated through a bonding mechanism.

The angle adjustment device 155 provides a capacity for making both a vertical and a horizontal adjustment of detection direction of the rectangular shaped LED sensing lamp 25. The angle adjustment device 155 is also designed to provide wiring channel for transmission of power supply and motion sensing signals between the LED sensing lamp 25 and the junction box 45.

The junction box 45 offers facility to install and fasten the LED security light 5 on a wall electric outlet to perform a lighting solution for security protection. The junction box 45 provides an accommodating space to accommodate a power supply unit to output DC or AC power for operating the LED security light and optionally the power control unit may be located in the junction box incorporating with a few external control devices for adjusting and setting various operating parameters such as the light-on duration activated by the PIR motion sensor 15B, the sensitivity or the detection range of the PIR motion sensor 15B or an illumination level of the LED security light 5 turned on by the PIR motion sensor 15B.

Figure 6B:
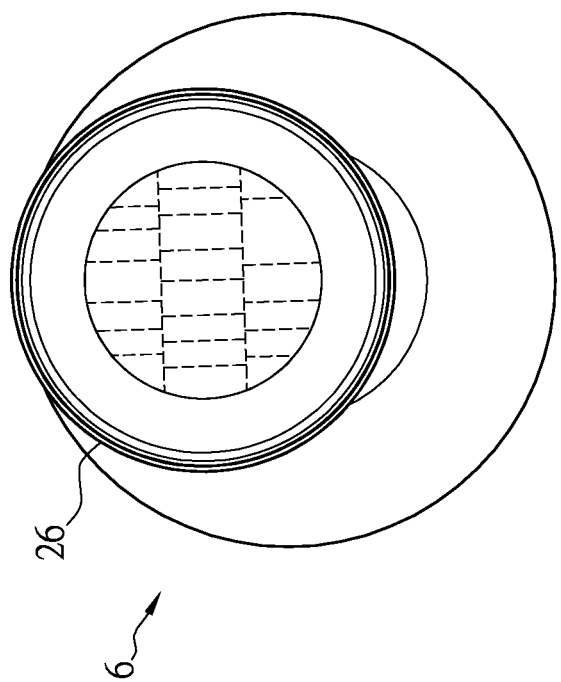
FIG. 6A and FIG. 6B are perspective views of a fourth embodiment of the present disclosure with the security light being a cone-shaped motion sensing lamp.
Figure 6A:
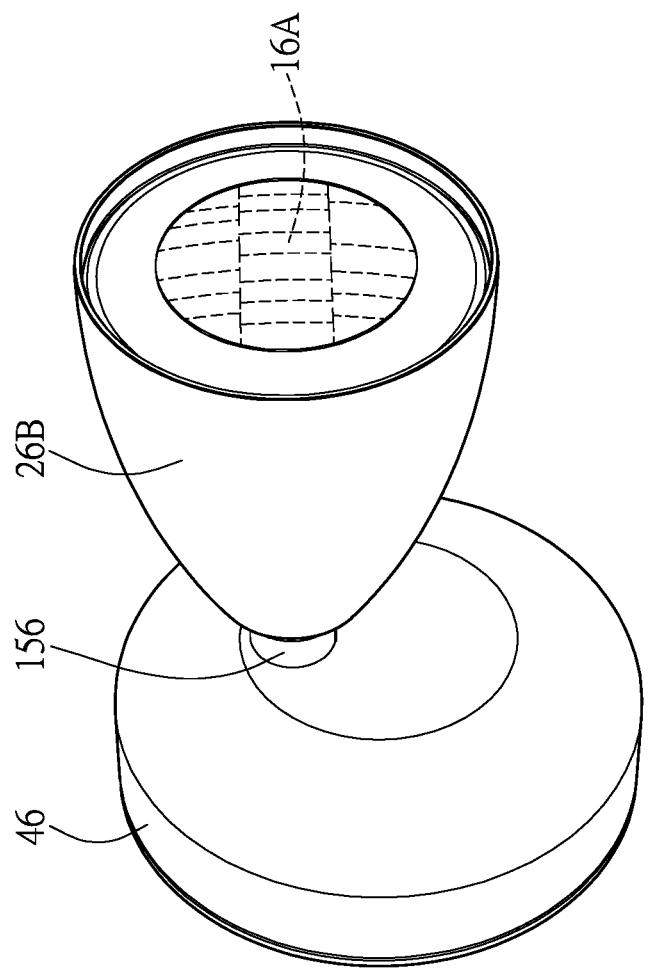

FIG. 6A and FIG. 6B are perspective views of another embodiment of an LED security light of the present disclosure. The LED security 6 includes a cone-shaped motion sensing LED lamp 26, an angle adjustment device 156 connected with the cone-shaped LED sensing lamp 26 and a junction box 46 connected with the angle adjustment device 156. A traditional PIR motion sensing unit is knocked down into two operating components including a Fresnel lens and PIR motion sensor. The cone-shaped motion sensing LED lamp 26 is configured with a lamp housing with an accommodating housing space formed by a first part housing and a second part housing to accommodate the Fresnel lens, the PIR motion sensor, a light emitting unit including a plurality of LEDs and a power control unit. The detail construction and function are similar to those described in the embodiment of FIG. 4 thus the redundant information is not repeated.

Figure 7A:
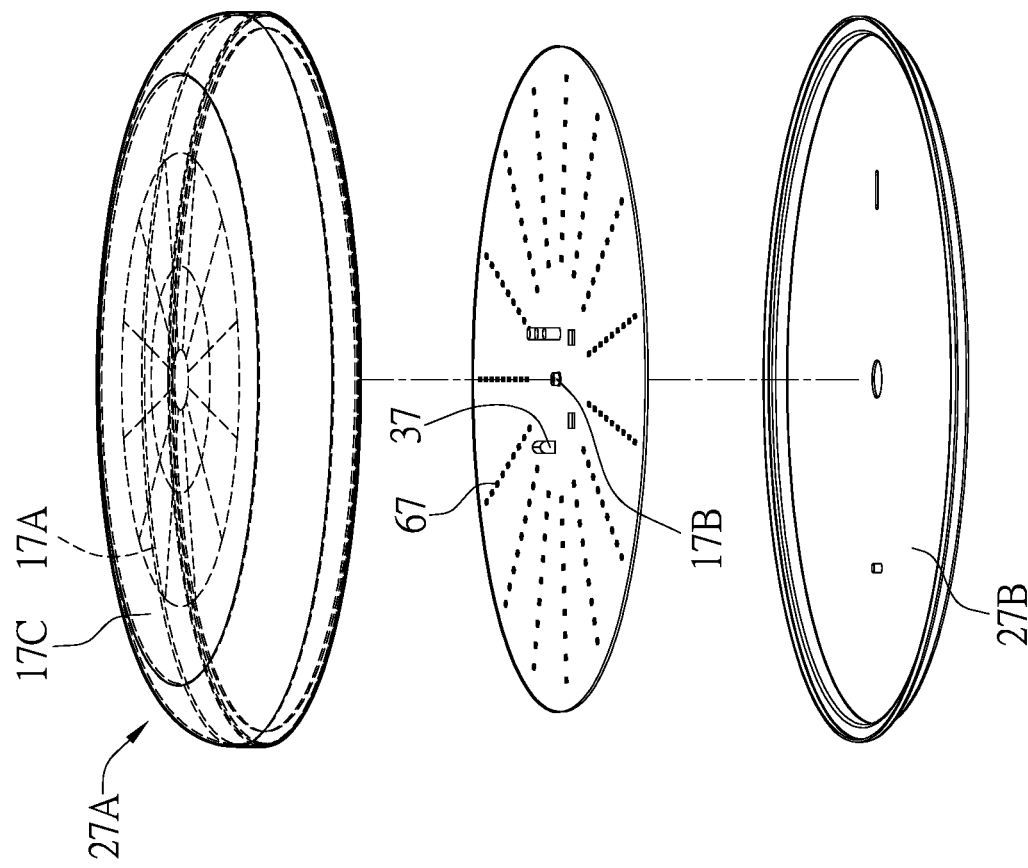
Figure 7A:
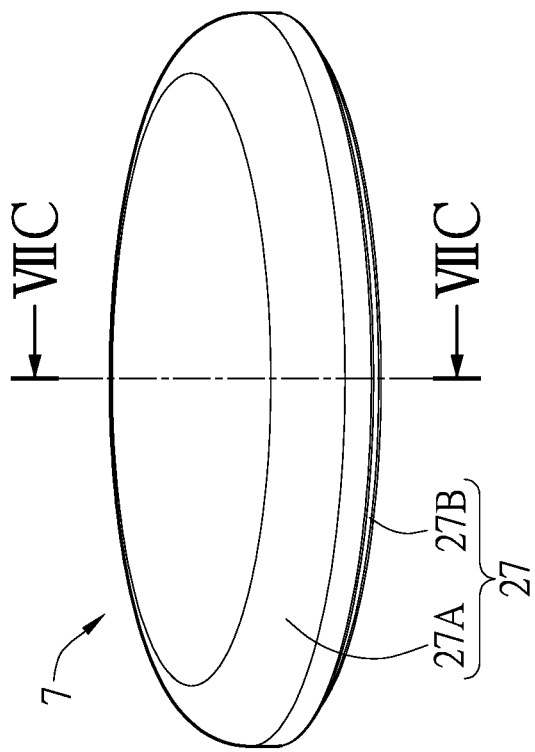
Figure 7C:
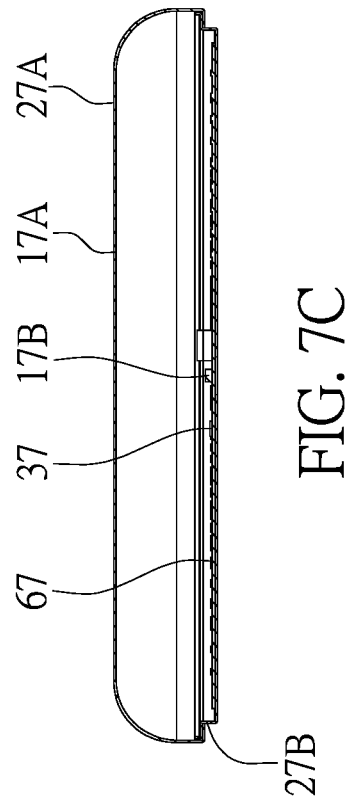

FIG. 7A to FIG. 7C illustrate another embodiment of a motion sensing LED light of the present disclosure. The motion sensing LED light 7 includes a bowl-shaped motion sensing LED lamp 27. A traditional PIR motion sensing unit is knocked down into two operating components including a Fresnel lens 17A and a PIR motion sensor 17B. The bowl-shaped motion sensing LED lamp 27 is configured with a lamp housing with an accommodating housing space formed by a first part housing 27A and a second part housing 27B to accommodate the Fresnel lens 17A, the PIR motion sensor 17B, a light emitting unit 67 including a plurality of LEDs and a power control unit 37. The first part housing 27A is a bowl-shaped hollow shell designed as a light diffuser for diffusing LED light generated by the light emitting unit 67. The second part housing 27B is a metal pan designed for accommodating at least an LED module of the light emitting unit 67 and the PIR motion sensor 17B. The power control unit 37 may optionally be installed on the inner surface of the metal pan or the outer surface of the metal pan 27B (the second part housing). Additionally, the Fresnel lens 17A is built on a first portion of the first part housing 27A and is integrated with the first part housing 27A for performing collection of IR ray signals generated by a motion intrusion, as well as LED light diffusion for the LED light generated by the light emitting unit 67. The Fresnel lens 17A collects IR ray signals and converges the IR ray signals toward a focal point where the PIR motion sensor 17B is positioned to receive the IR ray signals. Similar with the embodiments as illustrated in FIG. 3 to FIG. 6, the PIR motion sensor 17B is installed at a location in an accommodating space formed by the second part housing 27B and is surrounded by an LED module of the light emitting unit 67. The LED module of the light emitting unit 67 and the PIR motion sensor 17B are respectively attached to a metal base through respective circuit boards. A heat sink is also attached to the circuit board of the LED module for dissipating heat generated by the LED module of the light emitting unit 67. The PIR motion sensor 17B is additionally wrapped with a heat insulating material such that an IR ray signal detection circuitry electrically connected with the PIR motion sensor 17B can operate in an environment with a stable temperature. The power control unit 37 may be installed in the same space of the light emitting unit 67 and is electrically connected to the LED module of the light emitting unit 67 for controlling a transmission of electric power delivered to the LED module of the light emitting unit 67. The first part housing 27A and the second part housing 27B are fastened together through a fastening mechanism, wherein the fastening mechanism can be a twist lock construction, a press to lock construction, a plurality of screws or any other fastening device. Additionally, it is required that the Fresnel lens 17A is made with a material which is both IR ray and LED light receptive and penetrable such that the LED light is not blocked by the Fresnel lens 17A. The shape of the Fresnel lens 17A can be designed in different patterns as needed for maximizing a detection capacity.

So configured, when the PIR motion sensor 17B operating with the IR ray signal detection circuitry determines that the IR ray signals collected by the Fresnel lens 17A represent a motion intrusion, the IR ray signal detection circuitry outputs a motion sensing signal to a controller of the power control unit 37 which in turn generates a control signal to conduct a switching device to transmit an electric power to the LED module of the light emitting unit 67 to turn on the motion sensing LED light 7. In the absence of further motion or intrusion detected, the motion sensing LED light 7 is then automatically shut off.

With such configuration, the light diffuser 27A is divided into two portions. The first portion is the Fresnel lens 17A located in the central area or a side area of the light diffuser 27A and the second portion is the remaining area 17C surrounding the Fresnel lens 17A. The Fresnel lens 17A is made of a material which is both IR ray and LED light penetrable in order to serve a dual function of IR ray collection and light diffusion. The light diffuser 27A can be constructed with two configurations. The first configuration is a direct forming construction wherein the whole light diffuser 27A is made of both IR ray and LED light penetrable material with a pattern of the Fresnel lens being stamped on or printed on the first portion 17A of the light diffuser 27A. The second configuration is a two-step construction process, wherein the first portion of the diffuser is separately fabricated with a Fresnel lens pattern thru a plastic injection process and the light diffuser 27A is punched with a central open space to form the second portion 17C of the light diffuser 27A. The first portion 17A of the light diffuser 27A and the second portion 17C of the light diffuser 25A are then integrated through a bonding mechanism.

The second part housing 27B with a circular pan construction is also used for installing and fastening the motion sensing LED light 7 to an electric outlet in a ceiling space or in a wall space for performing a motion activated illumination.

FIG. 8A to FIG. 8C illustrate another embodiment of an LED security light of the present disclosure. The LED security light 8A is an enhancement of the LED security light 5 illustrated in FIG. 5. The LED security light 8A is a twin head design including two rectangular shaped motion sensing LED lamps 28-1 and 28-2, two angle adjustment devices 158-1 and 158-2 respectively connected with the two motion sensing LED lamps 28-1 and 28-2, and a junction box 48 connected with the two angle adjustment devices 158-1 and 158-2 respectively. The two motion sensing LED lamps 28-1 and 28-2 have the same construction and specification as the motion sensing LED lamp 25. So configured each of the two motion sensing lamps 28-1 and 28-2 can be respectively adjusted for a detection direction through its connected angle adjustment device to achieve a much broader detection scope than a conventional PIR motion sensing unit 11 as shown in FIG. 1. For the conventional PIR motion sensing unit, the detection angle is practically constrained to a 180-degree angle coverage while for the twin head design of the present disclosure the detection angle can easily achieve a 240-degree detection angle coverage which characterizes a unique functional feature of the twin head design.

Figure 8E:
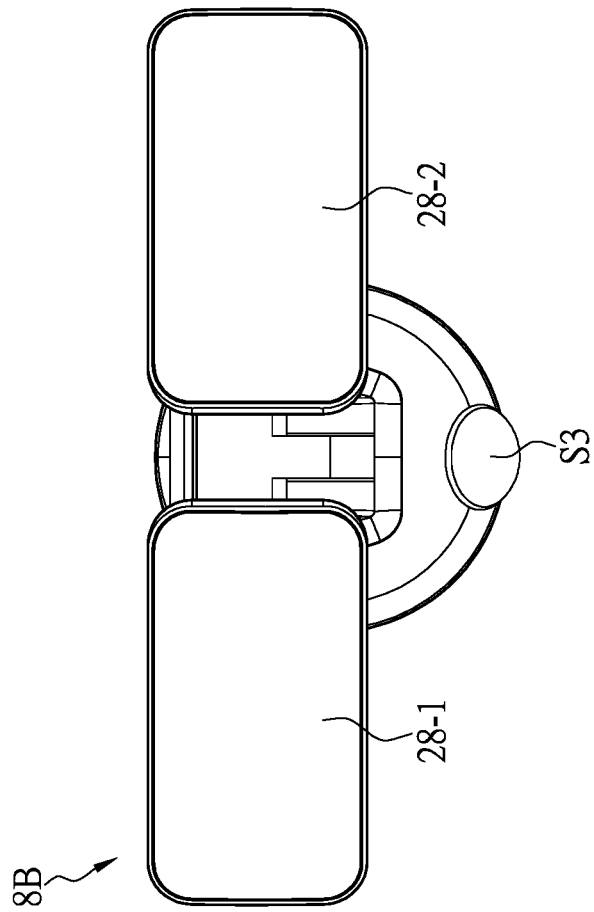
FIG. 8D and FIG. 8E are a perspective view and a front view of an enhancement of FIG. 8A with a third PIR motion sensing unit being installed in front of the junction box, respectively.
Figure 8D:
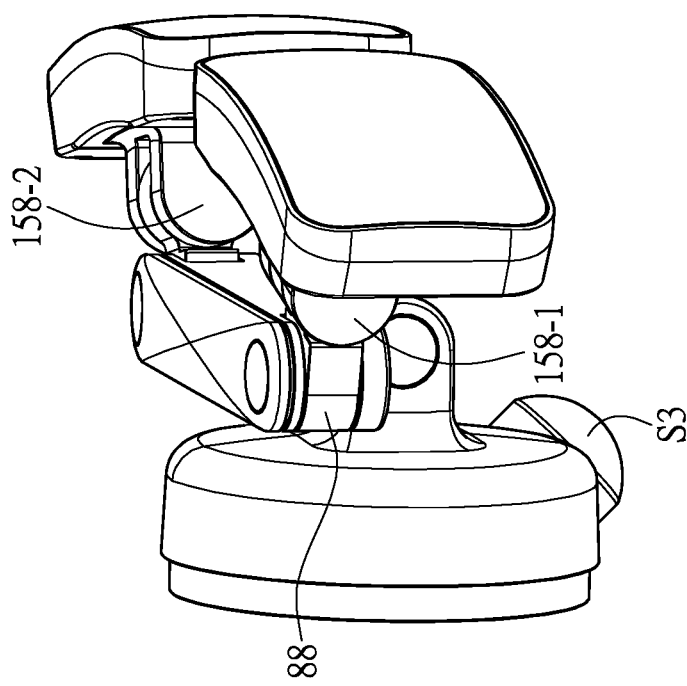
Figure 9A:
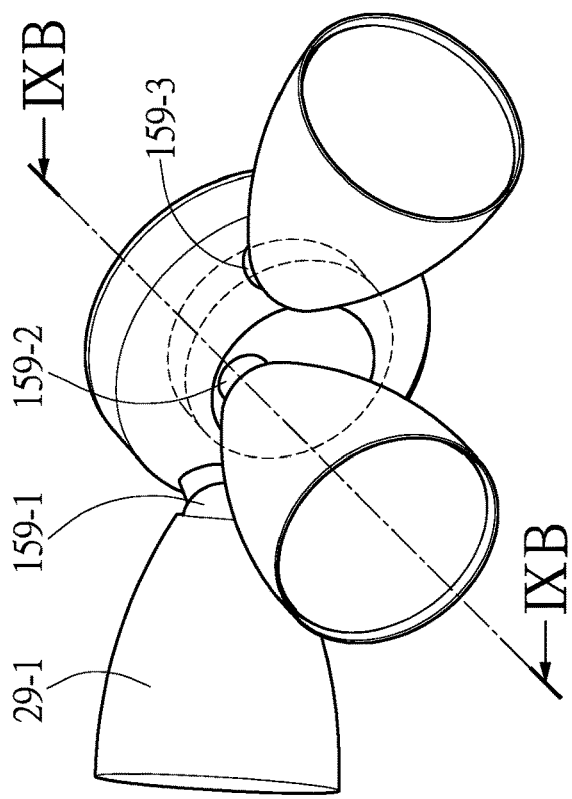
FIG. 9A to FIG. 9D are a perspective view, a cross-sectional view, a top view and a front view of a seventh embodiment of the security light including three cone-shaped motion sensing lamps of the present disclosure, respectively.
Figure 9B:
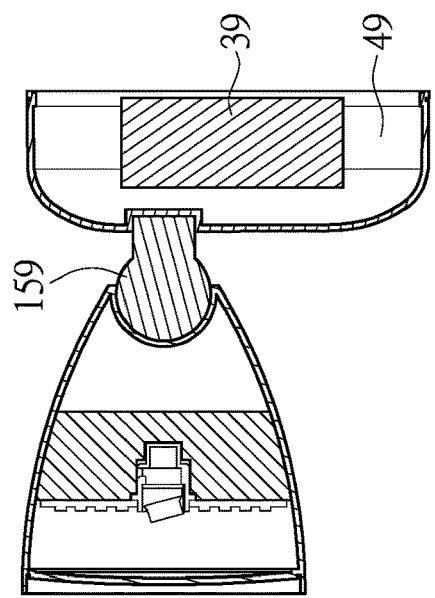
Figure 9C:
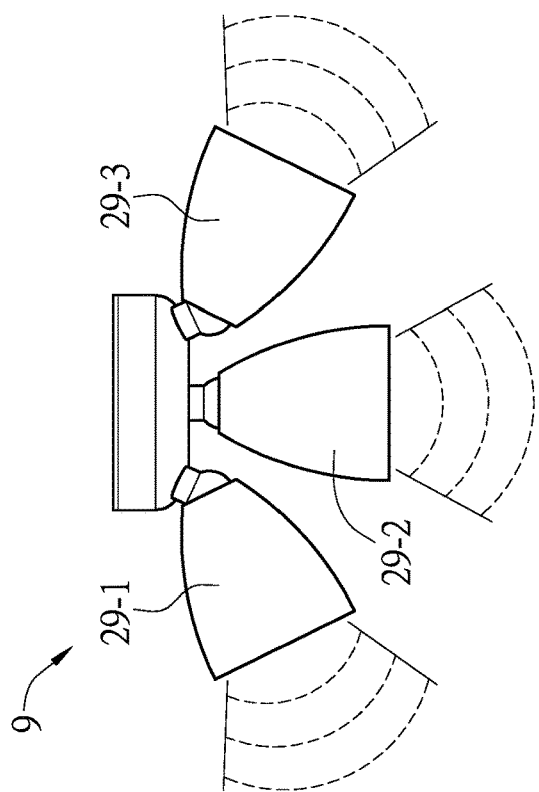
Figure 9D:
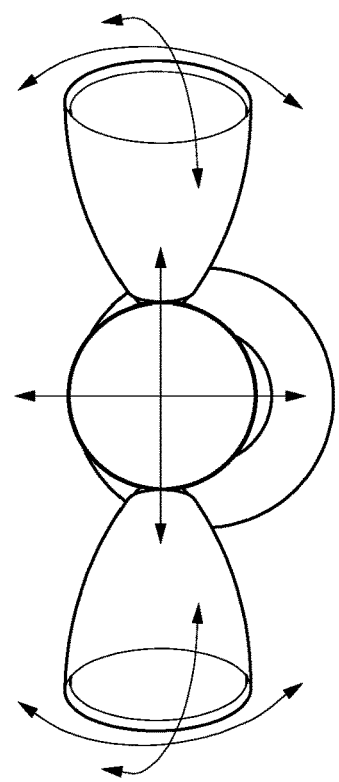

FIG. 8D and FIG. 8E are a further enhancement of FIG. 8A, wherein a third PIR motion sensing unit S3 is furthered installed in front of the surface of the junction box 48 for detecting motion intrusion in an area uncovered by the two motion sensing lamps 28-1 and 28-2. Wherein whenever one of the motion sensing lamp 28-1, the motion sensing lamp 28-2 or the third motion sensing unit S3 detects a motion intrusion signal, a motion sensing signal is generated and transmitted to a controller of a power control unit 38, wherein upon receiving the motion sensing signal the controller of the power control unit 38 manages to respectively output a control signal to conduct each switching device connected to each of the two light emitting units to turn on the two motion sensing LED lamps 28-1 and 28-2.

FIG. 9A to FIG. 9D illustrate a seventh embodiment of an LED security light of the present disclosure. The LED security light is an enhancement of the LED security light 6 illustrated in FIG. 6. The LED light 9 is a triple head design including three cone-shaped motion sensing LED lamps 29-1, 29-2 and 29-3, and three angle adjustment devices 159-1, 159-2 and 159-3 respectively connected with the three LED sensing lamps 29-1, 29-2 and 29-3. A junction box 49 is connected with the three angle adjustment devices 159-1, 159-2 and 159-3 respectively. Each of the three motion sensing LED lamps 29-1, 29-2 and 29-3 has the same construction and specification as the motion sensing LED lamp 26 in FIG. 6. With such configuration, each of the three motion sensing lamps can be respectively adjusted for a detection zone through its connected angle adjustment device such that the LED security light 9 can operate a much broader detection scope than a conventional PIR motion sensing unit 11 does as shown in FIG. 1. For the conventional PIR motion sensing unit, the detection angle is practically constrained to a 180-degree angle coverage while for the triple head design of the present disclosure the detection angle can easily achieve a 240 degree or higher detection angle coverage.

Figure 10C:
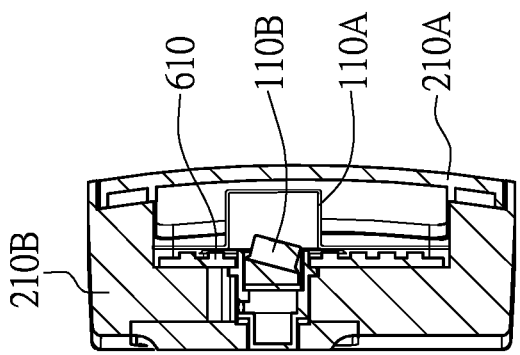
FIG. 10A to FIG. 10C are a perspective view, an exploded view and a cross-sectional view of an eighth embodiment with a Fresnel lens being designed to a position behind a light diffuser of the security light of the present disclosure, respectively.
Figure 10A:
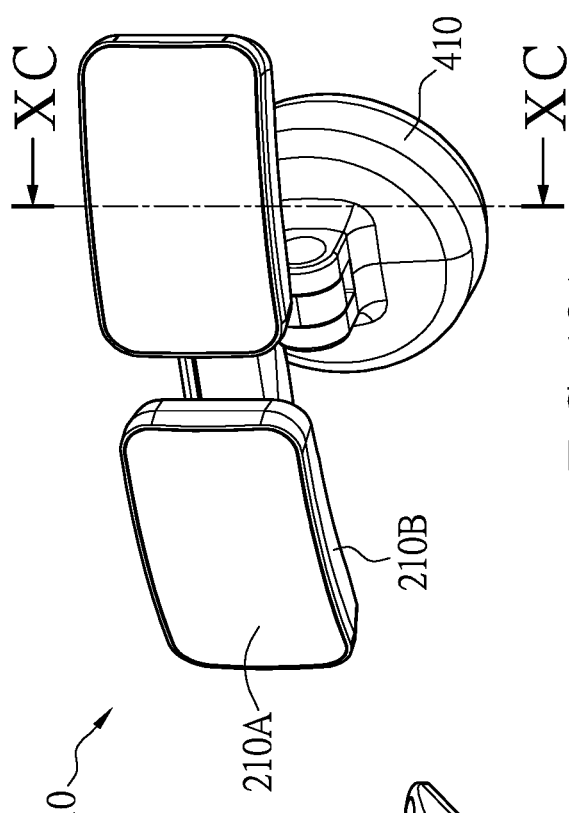
Figure 10B:
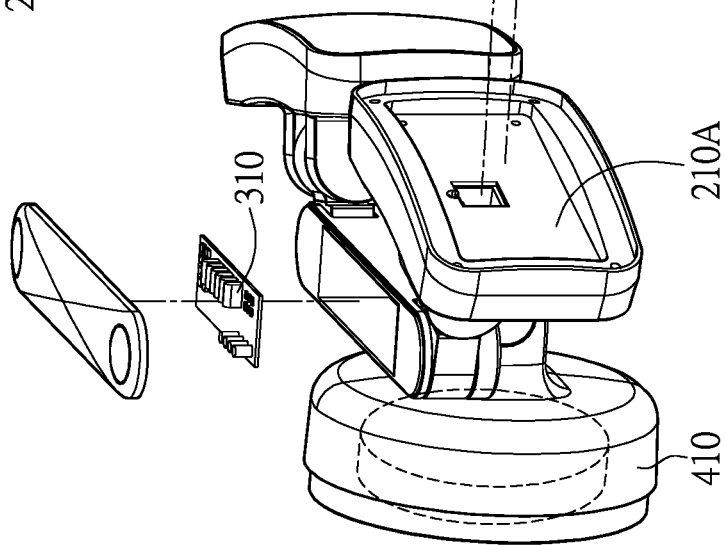

Referring to FIG. 10A to FIG. 10C, which is a perspective view, an exploded view and a cross-sectional view of an eighth embodiment of the present disclosure. A Fresnel lens 110A is positioned behind a light diffuser 210A to collect and converge IR ray signals passing through the light diffuser 210A toward a PIR motion sensor 110B, wherein the PIR motion sensor 110B operating with an IR ray signal detection circuitry determines if the IR ray signals represent a motion intrusion in order to turn on an LED module of a light emitting unit 610. A plurality of motion sensing lamps configured with such Fresnel lens may be assembled together to perform a multidirectional detection capacity similar to the arts schematically illustrated in FIG. 8A, FIG. 8B and FIG. 9.

Figure 11B:
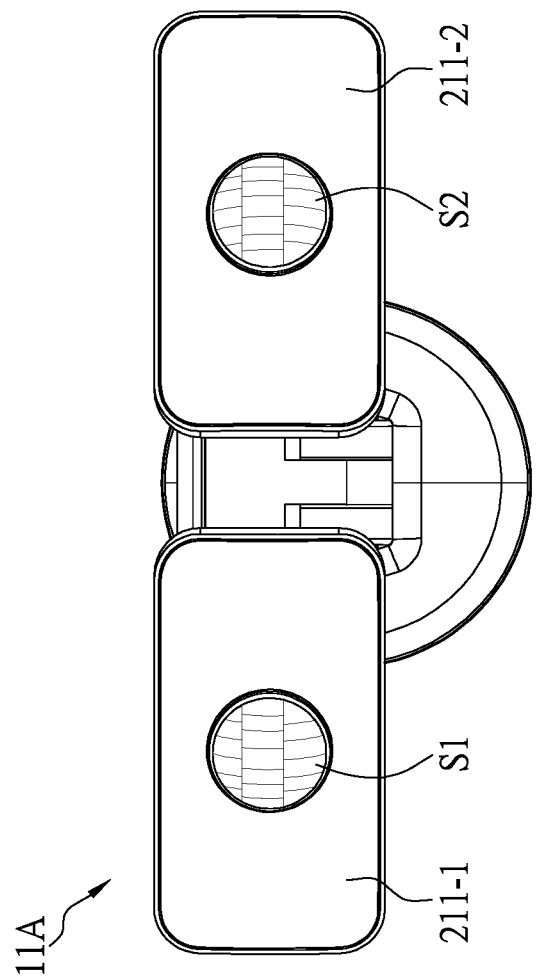
FIG. 11A and FIG. 11B are a perspective view and a front view of a ninth embodiment of the security light with two rectangular shaped LED motion sensing lamps and two traditional PIR motion sensing units being embedded in each of the two LED motion sending lamps according to the present disclosure, respectively.
Figure 11A:
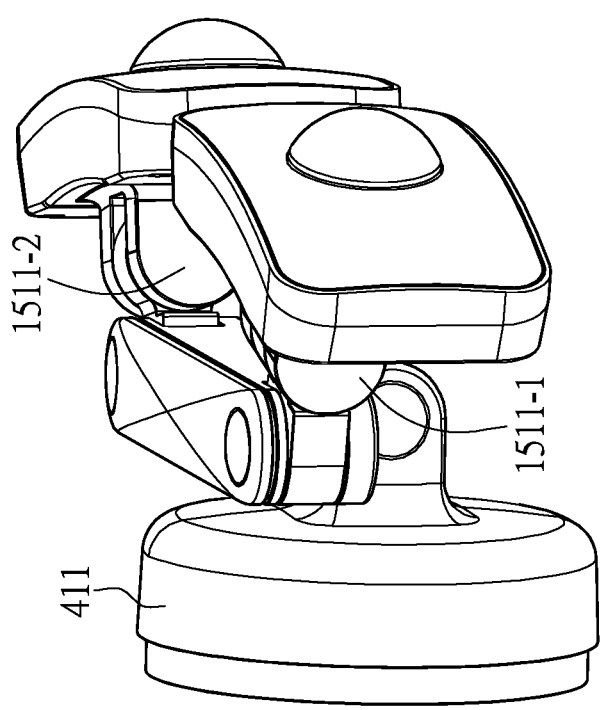

FIG. 11A and FIG. 11B a perspective view and a front view of a ninth embodiment of the present disclosure for an LED security light 11A. The LED security light 11A is a twin head design including two rectangular shaped motion sensing LED lamps 211-1 and 211-2, two angle adjustment devices 1511-1 and 1511-2 respectively connected with the two motion sensing LED lamps 211-1 and 211-2, and a junction box 411 connected with the two angle adjustment devices 1511-1 and 1511-2, respectively. Two PIR motion sensing units S1 and S2 are respectively embedded in the two motion sensing LED lamps 211-1 and 211-2, and are surrounded respectively by each light diffuser of the two motion sensing lamps such that the detection angles of the two PIR motion sensing units S1 and S2 are aligned along the same direction of the light projection of the two motion sensing lamps 211-1 and 211-2. With such configuration the LED security light 11A is capable of detecting a much broader detection zone than the conventional security light as the PIR motion sensing unit of the traditional security light only allows one angle selection at any time to cover one detection zone while the present disclosure allows to make angle adjustments with the two angle adjustment devices 1511-1 and 1511-2 to respectively cover two detection zone. The motion sensing unit S1 and S2 are traditional construction with the Fresnel lens and PIR motion sensor integrated as one unit.

Figure 11D:
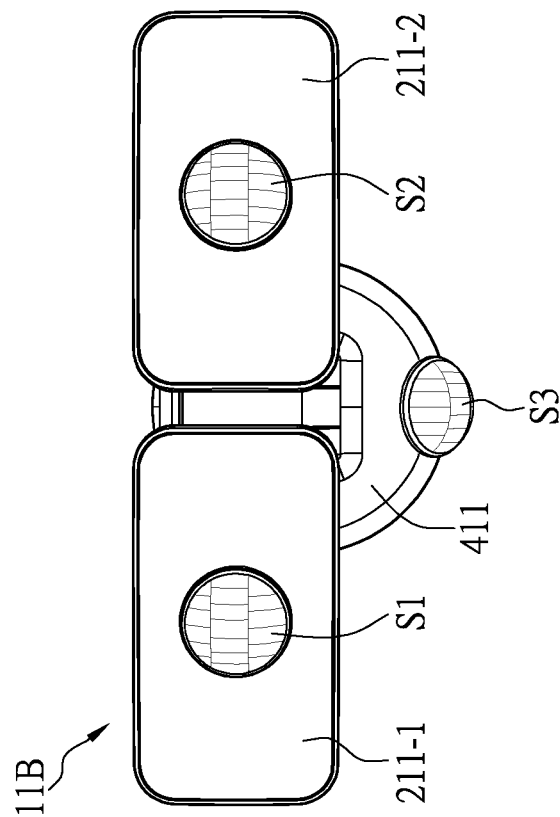
FIG. 11C and FIG. 11D are a perspective view and a front view of an enhancement of FIG. 11A with a third PIR motion sensing unit being installed in front of the junction box, respectively.
Figure 11C:
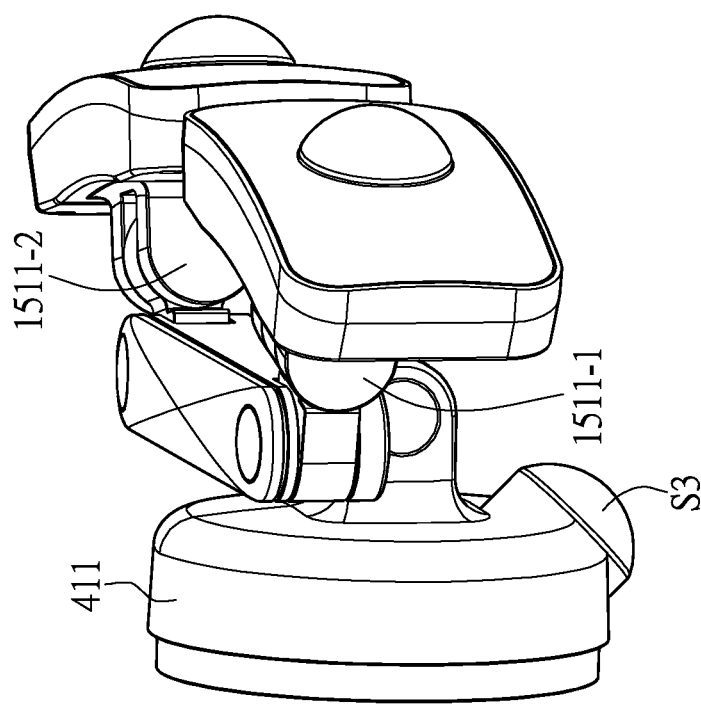

FIG. 11C and FIG. 11D show a further enhancement of the LED security light according to FIG. 11A. A third motion sensing unit S3 is further installed in the front surface of the junction box 411 for detecting intrusion in an area not covered by the two motion sensing units S1 and S2. When any of the three motion sensing units first detects a motion intrusion, a signal processing circuitry operates to generate a motion sensing signal to be delivered to a controller of a power control unit. When receiving the motion sensing signal, the controller manages to turn on the LED security light 11B.

Figure 12B:
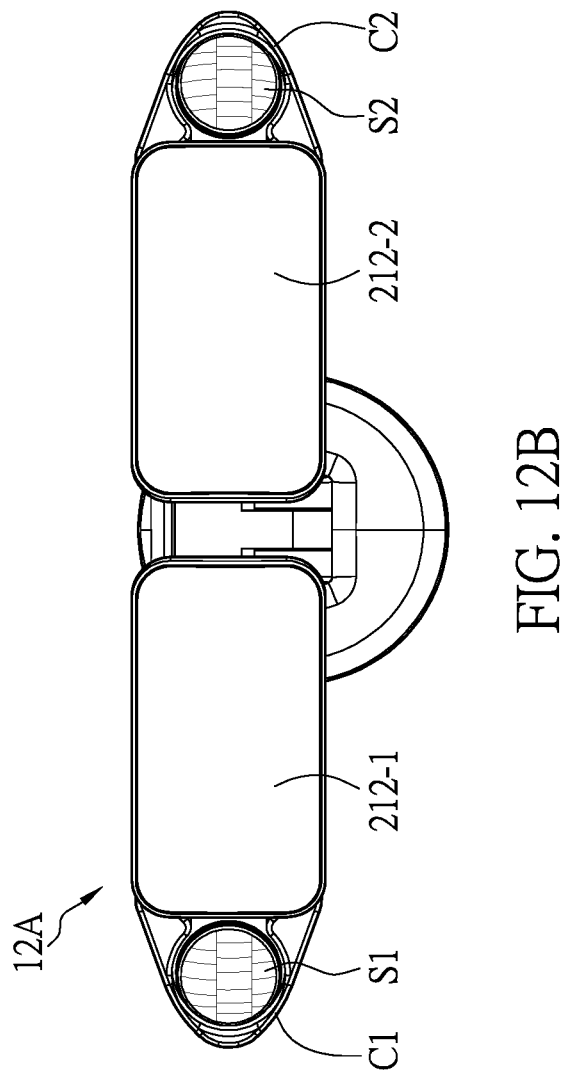
FIG. 12A and FIG. 12B are a perspective view and a front view of a tenth embodiment of the present disclosure with two PIR motion sensing units being respectively and externally connected to each outer edge of the two LED motion sensing lamps, respectively.
Figure 12A:
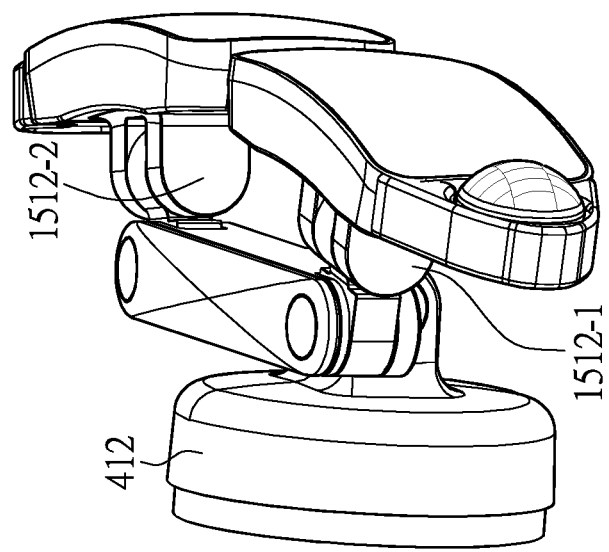

FIG. 12A and FIG. 12B are a perspective view and a front view of a tenth embodiment of an LED security light according to the present disclosure. The LED security light 12A is a twin head design, wherein two motion sensing units S1 and S2 are respectively and externally installed to each outer edge of a twin housing for accommodating two LED lamps 212-1 and 212-2 by connection devices C1 and C2. With such arrangement the detection scope of the LED security light 12A is synchronously expanded along an angle opening direction of two angle adjustment devices 1511-1 and 1512-2 respectively connected to each of the two LED lamps 212-1 and 212-2. The two connection devices C1 and C2 can be a detachable construction or a non-detachable connection. Whenever any one of the two motion sensing units S1 and S2 first detects a motion intrusion, a motion sensing signal is generated and transmitted through one of the two connection devices C1 or C2 to a controller of a power control unit. When receiving the motion sensing signal, the controller of the power control unit manages to turn on the two LED lamps 212-1 and 212-2 simultaneously.

Figure 12D:
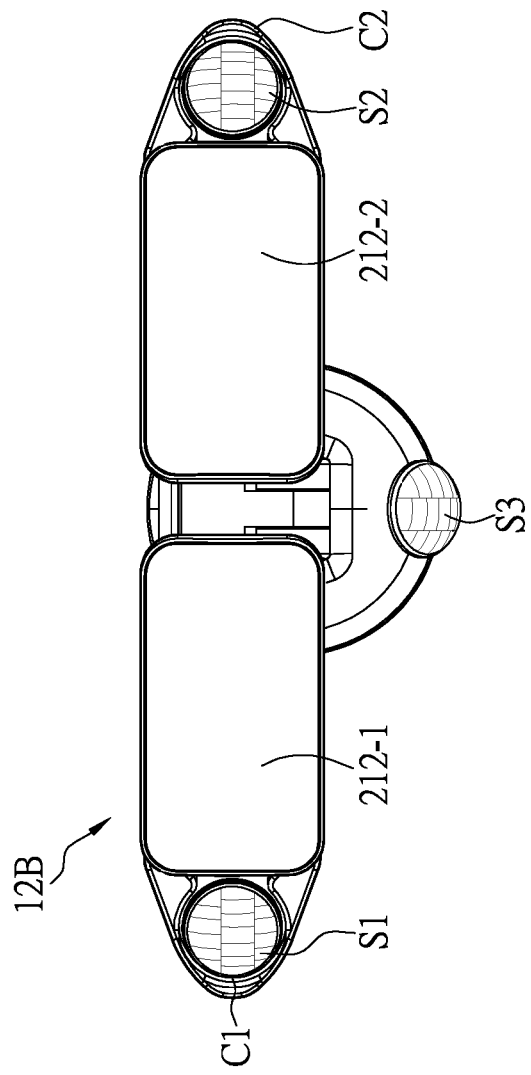
FIG. 12C and FIG. 12D are a perspective view and a front view of a further enhancement of the LED security light of FIG. 12A with a third PIR motion sensing unit installed in front of a junction box, respectively.
Figure 12C:
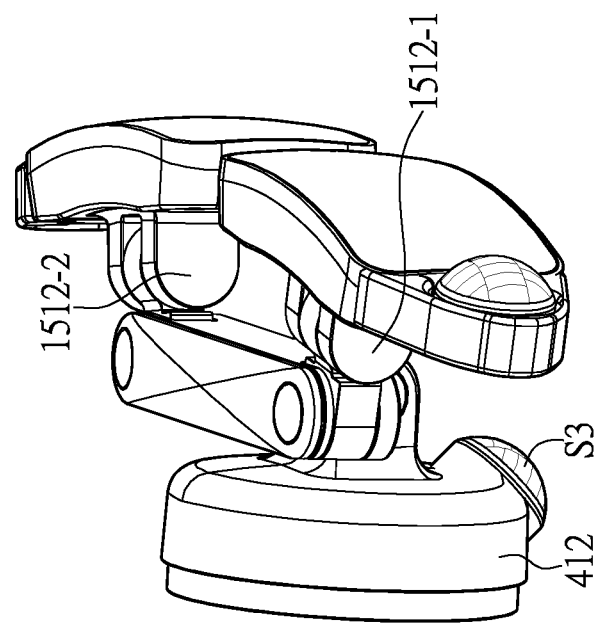

FIG. 12C and FIG. 12D are a perspective view and a front view of a further enhancement of the LED security light of FIG. 12A. A third motion sensing unit S3 is further installed in the front surface of the junction box 412 for detecting motion intrusion in an area not covered by the two motion sensing units S1 and S2. When any one of the three motion sensing units first detects a motion intrusion, a signal processing circuitry operates to generate a motion sensing signal to be delivered to a controller of a power control unit. When receiving the motion sensing signal, the controller manages to turn on the LED security light 12B.

FIG. 13A to FIG. 13B are a perspective view and a front view of an eleventh embodiment of an LED security light 13 of the present disclosure. The LED security light 13 includes a donut-shaped LED lamp 213 integrated with a PIR motion sensing unit S1, an angle adjustable device 1613 connected with the LED lamp 213, and a junction box 413 connected with the angle adjustable device 1613. The integrated PIR motion sensing unit is further incorporated with a swivel device (sensor angle adjustable device) 1513 which is also a mounting support to electrically connect and mechanically integrate the PIR motion sensing unit S1 to the LED lamp 213. The swivel device 1513 enables the PIR motion sensing unit S1 to be adjusted from the center of the LED lamp 213 to one side of the LED lamp 213; the swivel device 1513 also allows the PIR motion sensing unit S1 be adjusted both horizontally and vertically. FIG. 13C and FIG. 13D show the PIR motion sensing unit being rotated to a top of the LED lamp and the LED lamp 213 illuminates horizontally. FIG. 13E and FIG. 13F show the PIR motion sensing unit being rotated to a back of the LED lamp 213 and the LED lamp illuminates vertically. With such configuration, the LED lamp 213 is capable of detecting a flexible detection zone. Together with the angle adjustable device 1613, the LED security light 13 is capable of detecting a much more flexible detection zone suitable for all kinds of application environments.

FIG. 14A and FIG. 14B are a perspective view and a front view of an LED security light of twelfth embodiment of the present disclosure. The LED security light 14 is a twin head structure including two donut-shaped LED lamps 214-1 and 214-2 integrated respectively with two PIR motion sensing units S1 and S2, two angle adjustable devices 1614-1 and 1614-2 respectively connected with each of the two donut shaped LED lamps 214-1 and 214-2, and a junction box 414 connected with the two angle adjustable devices 1614-1 and 1614-2. The PIR motion sensing units S1 and S2 are integrated and respectively incorporated with two swivel devices 1514-1 and 1514-2 which also serve as mounting supports respectively to electrically connect and mechanically integrate each of the PIR motion sensing units S1 and S2 to each of the LED lamps 214-1 and 214-2. The two swivel devices 1514-1 and 1514-2 enable the PIR motion sensing units S1 and S2 to be optionally adjustable adjusted from each center of the LED lamps 214-1 and 214-2 to one side of the each LED lamps 214-1 and 214-2 or vice versa; the two swivel devices 1514-1 and 1514-2 also allow each of the PIR motion sensing units S1 and S2 be adjusted both horizontally and vertically. FIG. 14C and FIG. 14D show the two PIR motion sensing units which are rotated to an outer side of the two LED lamps, respectively. With such configuration, the LED lamps 214-1 and 214-2 are capable of detecting a broader and flexible detection zone. Together with the angle adjustable devices 1614-1 and 1614-2, the LED security light 14 is capable of detecting a much broader and more flexible detection zone suitable for all kinds of application environments.

For the above disclosed embodiments including FIG. 13A to FIG. 13F and FIG. 14A to FIG. 14D, the LED lamps are all configured with a donut-shaped lamp shade construction, such donut-shape lamp shade is only an embodiment of surrounding lamp shades which can be designed with many different arts featuring a surrounding lamp shade with a central hollow space to optionally accommodate a PIR motion sensing unit. For example, the surrounding lamp shade can be an oval ring, a rectangular ring or a square ring. The present invention is not restricted to any particular surrounding shade.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An LED security light with an integrated motion sensor comprising:
   a lamp housing, divided into a first part housing and a second part housing, wherein at least said first part housing is configured with a light diffuser;
   a light emitting unit, configured with an LED load including a plurality of LEDs installed inside said lamp housing;
   at least one condensing lens, installed at said first part housing and integrated seamlessly with said light diffuser of said first part housing;
   an infrared ray motion sensor, coupled with an infrared ray signal detection circuitry, installed inside said second part housing and positioned at a focal point determined by said at least one condensing lens; and
   a power control unit, to control said LED load to be turned on for emitting light or to be turned off;
   wherein said first part housing and said second part housing are coupled and fastened through a fastening arrangement to form said lamp housing for accommodating operating components including at least said at least one condensing lens, said light emitting unit, and said infrared ray motion sensor coupled with said infrared ray signal detection circuitry;
   wherein said at least one condensing lens is designed and made of a material penetrable by both infrared ray and LED light to perform a dual function of infrared ray collection and LED light diffusion;
   wherein said at least one condensing lens is designed to collect infrared ray signals generated by an intruder and to remotely converge said infrared ray signals at said infrared ray motion sensor installed in said second part housing such that said infrared ray signals are received, and wherein said infrared ray motion sensor in conjunction with said infrared ray signal detection circuitry decides whether said infrared ray signals being received represent a motion intrusion signal and then operates to activate the power control unit to turn on said LED load to perform a high level illumination for a predetermined time duration.

2. The LED security light with an integrated motion sensor according to claim 1, wherein said first part housing and said second part housing are detachably coupled and fastened together with each other.

3. The LED security light with an integrated motion sensor according to claim 1, wherein said LED security light is a PIR light bulb, wherein said second part housing is configured with a funnel base with a hollow construction, wherein a bottom end of said funnel base is connected with a lamp cap for adapting to an AC power socket, wherein a top end of said funnel base is configured with a platform for mounting a circuit board, wherein said plurality of LEDs and said infrared ray motion sensor are both mounted on said circuit board, wherein said infrared ray motion sensor is required to locate at said focal point determined by said at least one condensing lens while being surrounded by said LEDs of said light emitting unit, wherein the inner space of said funnel base is used for mounting and accommodating at least said power control unit and a heat dissipating sink constructed for said light emitting unit.

4. The LED security light with an integrated motion sensor according to claim 1, wherein a base plate is installed inside said second part housing for mounting a circuit board, wherein said LEDs and said infrared ray motion sensor are mounted on said circuit board, wherein said infrared ray motion sensor is required to locate at said focal point determined by said condensing lens while being surrounded by said LEDs.

5. The LED security light with an integrated motion sensor according to claim 4, further comprising a heat dissipating sink constructed for said light emitting unit and a power supply unit that are accommodated and mounted in a housing space formed by said base plate and said second part housing, wherein said power control unit is accommodated and mounted in the housing space.

6. The LED security light with an integrated motion sensor according to claim 1, wherein said power control unit and a power supply unit are installed inside a junction box electrically and mechanically connected with said lamp housing for mounting said LED security light on an electric outlet.

7. The LED security light with an integrated motion sensor according to claim 1, wherein a time setting unit is further installed and is electrically coupled with said power control unit for adjusting and setting a time length of said predetermined time duration for performing said high level illumination.

8. The LED security light with an integrated motion sensor according to claim 1, wherein a light sensing unit is electrically coupled with said power control unit to switch on said LED load at dusk and switch off said LED load at dawn.

9. The LED security light with an integrated motion sensor according to claim 1, wherein said light diffuser integrated with said at least one condensing lens is fabricated with one step construction process, wherein said light diffuser is made of a plastic material penetrable by both infrared ray and LED light, wherein said at least one condensing lens is designed on the light diffuser thru a stamping process, a three dimension printing process or an injection process to form an integrated piece of said light diffuser.

10. The LED security light with an integrated motion sensor according to claim 1, wherein said light diffuser integrated with said at least one condensing lens is fabricated with a two-step construction process, wherein said at least one condensing lens is separately fabricated thru a first plastic injection process or a three dimension printing process, wherein said light diffuser is configured with at least one open space for accommodating said at least one condensing lens for forming a seamless integration thru a second plastic injection process, or thru an ultrasonic welding, or thru a mechanical fastening arrangement.

* * * * *